(12) United States Patent
Ardis et al.

(10) Patent No.: US 6,591,373 B1
(45) Date of Patent: Jul. 8, 2003

(54) UNIFORM CONFIGURATION CONTROLLER FOR REPLICATED COMPONENT SYSTEMS

(75) Inventors: Mark Alan Ardis, Naperville, IL (US); Robert Gregg Olsen, Elgin, IL (US); Paul Mitchell Pontrelli, Hanover Park, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/461,886

(22) Filed: Dec. 15, 1999

(51) Int. Cl.[7] .............................................. G06F 11/00
(52) U.S. Cl. ......................................... 714/7; 709/221
(58) Field of Search ........................... 714/7; 709/221; 713/100; 710/104

(56) References Cited

U.S. PATENT DOCUMENTS

| | | | | |
|---|---|---|---|---|
| 5,968,184 A | * | 10/1999 | Kedem | 711/112 |
| 6,085,333 A | * | 7/2000 | DeKoning et al. | 707/202 |
| 6,314,461 B2 | * | 11/2001 | Duckwall et al. | 709/221 |
| 6,378,068 B1 | * | 4/2002 | Foster et al. | 713/1 |
| 6,385,668 B1 | * | 5/2002 | Gaddess et al. | 370/254 |

FOREIGN PATENT DOCUMENTS

EP          0423421 A2    4/1991 ........... G06F/11/00

* cited by examiner

Primary Examiner—Robert Beausoliel
Assistant Examiner—Marc M Duncan
(74) Attorney, Agent, or Firm—Stephen M. Gurey

(57) ABSTRACT

In a replicated component system, changing the condition of a component can deleteriously effect the system as a whole unless the result of making such a change may have on other components is considered. In response to a request to change the condition of a subject component to a specified condition, where the request is from a fixed set of request operations, the request is first validated using a particular validation algorithm associated with the request type. If the request is successfully validated (i.e., a determination is made using the validation algorithm that making the requested change will not negatively affect the system or components with which the subject component has a relationship), then the request is realized using a particular realization algorithm associated with the request type. Each validation algorithm and realization algorithm are from fixed sets of such algorithms that are associated with each possible request operation. Prior to effecting a change to any component in the system, the configuration controller is provided with information that includes the type of component that each component in the system is and the relationships that exist between components. Such relationships are also from a fixed set of possible relationships. This information is provided through a graphical user interface in which the attributes of each component type and the relationships between components are specified using dialog windows and a canvas window which visually displays representations of each component in the system and the relationships that exist between these components.

49 Claims, 8 Drawing Sheets

UNIFORM CONFIGURATION CONTROLLER FOR REPLICATED COMPONENT SYSTEMS

CROSS REFERENCE TO RELATED APPLICATION

This application describes and claims subject matter that is also described in co-pending United States patent application filed simultaneously herewith and entitled: "A GRAPHICAL USER INTERFACE FOR PROVIDING COMPONENT RELATIONAL INFORMATION FOR A UNIFORM CONFIGURATION CONTROLLER FOR REPLICATED COMPONENT SYSTEMS", Ser. No. 09/464,602.

TECHNICAL FIELD

This invention relates to multi-component systems in which components are replicated to provide reliability.

BACKGROUND OF THE INVENTION

Large systems are generally composed of many smaller components which may individually be hardware, software, firmware, or a combination of such. Different types of components perform different functions within the larger system. In order to ensure reliability should an individual component fail, components are replicated within the system, i.e., multiple copies of the same component type are present in the system. Thus, if a component fails, its function may be taken over by a backup component to the failed component.

In a large system, the condition of each component, working or backup, needs to be monitored. The primary condition of any component at any time may be either: 1) working, i.e., performing its intended function; 2) ready, i.e., not actually performing its intended function but healthy and capable of performing; 3) unready, i.e., not yet in an operative state and requiring some action before the component becomes operative; or 4) unusable, i.e., the component is not usable. The primary condition of a backup component is normally ready but occasionally may be unready.

In a replicated component system, a mechanism needs to be present to monitor and control the configuration of the system, where the configuration of the system is defined as the collection of all components and their conditions, and the relationships between the components. In the prior art, in addition to being a backup component to another component, other relationships between components have been recognized to exist. For example, one or more components can be a child of a parent component, where the child performs work for its parent. If a parent fails, the system needs to be reconfigured to find another parent for all of its children. Another well known relationship is known as sparing. In a sparing relationship, a minimum number of working components of the same type are required to perform the same function, each being able to do the work of one another. A special case of the sparing relationship between only two components of the same type is known as the mate relationship in which one of the components in the pair is working and the other one is a standby component.

A configuration controller is an entity associated with a system that allows the configuration of the system to be changed. For example, a configuration controller can determine that there are not enough working components of a given type and change the condition of a spare component to make it a working component. In the prior art, configuration control either could be effected from a central control location or could be distributed throughout the system. In the prior art, configuration controllers behave inconsistently depending upon what type of component is being changed. Specifically, such inconsistency may result from mistakes made by an individual who is manually performing the steps to effect a change. Further, in automatic fault detection systems in which component failures are detected and acted upon, the software that performs the functionalities to effect the changes is frequently written incorrectly due to a lack of understanding by the programmer as to how each component may need to be changed differently than how other components are changed. Thus, such fault detection systems generally fail to determine the overall effect on a system that may result from changing one component. Specifically, making a change to one component can actually be more deleterious to the state of the system as a whole than leaving a possibly faulty component in the system. Also, such fault detection systems fail to consider the order in which the conditions of different components may need to be changed. Even further, in the prior art, every time a new type of component is introduced into a system, a re-analysis of the configuration control for that component needs to be performed.

A need exists, therefore, to be able to consistently control the configuration of a system by monitoring the conditions of the components that comprise the system and allowing a change to the condition of each of the components.

SUMMARY OF THE INVENTION

The configuration controller, in accordance with the present invention, in response to a request to change the condition of a component from a fixed set of request operations, performs one of a fixed set of common algorithms in which either the request is denied or is carried out by following a predetermined sequence of steps which are determined in accordance with requested operation. Advantageously, the fixed set of common algorithms can be applied to any system consisting of a plurality of replicated components of any kind be they software, hardware, firmware, or any combination thereof, once the relationships between components from a fixed set of relationships is defined and provided to the configuration controller.

In an embodiment of the present invention, when a request to change the condition of a component is received, the configuration controller first decides whether the result of that change will result in a safe condition for the system as a whole, i.e., it will determine whether the system will behave properly once the change is made. Thus, each request is validated before realization of the request is effected through a particular algorithm from the set of fixed realization algorithms.

In order to process requests for a change in the condition of a component, various information relating to each component within the system and the relationships that exist between components in the system are provided to the configuration controller. Thus, each component in the system has one and only one component type, where the type of each component in the system is defined as possessing certain attributes associated with all components of that type. Further, each component may have relationships with other components in the system, which relationships are specified. The inventors have discovered additional relationships that can exist between components in addition to the previously noted prior art relationships of child, spare, and mate. These relationships between components include a helper, an interrupt physical unit group, a logical unit group, and a switch physical unit group. Components of one particular type may be only related to components of other types by certain relationships.

Each component in a system at any instance of time may have one and only one condition. The condition of a component is a combination of four independent conditions: (1) a primary condition, which may be one of: working, ready, unready, and unusable; (2) a secondary condition, which may be one of: primary, secondary, forced, automatic, manual, growth, and null; (3) a tertiary condition, which may be one of: campon, degraded, diagfail, diagnostic, facfail, family of equipment, farfail, helper, init, interdiag, maintiprog, nearfail, pwralarm, pwroff, roudiag, trouble, update, warming, and null; and (4) an inhibit state, which may be either inhibited or uninhibited.

When a request to change the configuration of a system is received, it can be one of a defined fixed plurality of request types that are applied to the system: remove, restore, switch, inhibit, allow, restart, refresh, resynchronize, and update. Further, in the exemplary embodiment of the invention, a desired condition of the component is specified with each request as well as a level of validation, which, in the particular embodiment, is an integer between one and six. For each request type, one and only one predetermined fixed algorithm describes the validation processing that is used to effect such a request. Further, for each request type, one and only one predetermined fixed algorithm describes the realization processing that is used to effect such a request. Both the set of validation algorithms and the set of realization algorithms are commonly applied to any replicated component system regardless of what those components are or how they function in the system as a whole, and whether they are hardware, software, or a combination of both.

Advantageously, once all of the components of a system are individually defined by their type and the relationships that exist between all the components, which information initializes the configuration controller, a subsequent request for a condition change to one or more components from a fixed set of possible requests is effected by first validating the request and then, if the request is validated, realizing that request by performing the steps of the particular realization algorithm associated with the request type. Thus, for example, a component may be suspected of being faulty, which information might be signaled to a maintenance administrator through, for example, conventional fault detection circuitry. As a result, removal of that component from the system may be desired so that it can be diagnosed. That component thus needs to be changed from being an active component to a standby component, for example. In addition to changing the condition of the suspect component, the condition of many other components that have a relationship with the suspect component may also need to be changed such as those components that were sending data to or receiving data from the suspect component. Further, other components may need to become active, when originally their conditions were standby. By using the relationships that exists between components and by following the steps in the remove realization algorithm, an appropriate sequence of component condition changes are effected to safely achieve the desired condition change of the subject component.

DETAILED DESCRIPTION

Figure 1:
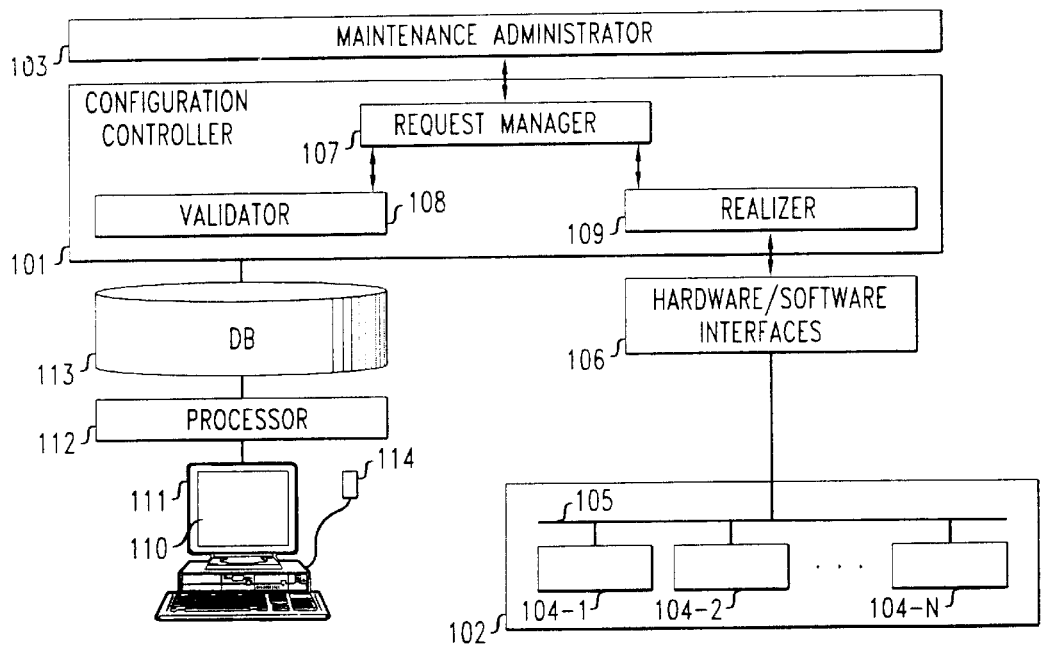
FIG. 1 is a block diagram showing the overall architecture of an embodiment of the present invention.

With reference to FIG. 1, a block diagram illustrates an embodiment of the architecture of the present invention. A configuration controller 101 operates cooperatively with a replicated multi-component system 102 to effect a condition change to one or more components within system 102 in response to a request for a condition change from a maintenance administrator 103. The multiple components 104-1–104-N that comprise system 102 may be hardware, software, firmware, or any combination thereof. Each component 104-1–104-N is illustratively shown connected via a bus 105 to the configuration controller 101 through common hardware/software interfaces (HSIs) 106. In practice, a separate hardware/software interface associated with each component can connect that component to the configuration controller. Alternatively, some components within system 102 can be connected to the configuration controller through a common hardware/software interface and other components can be connected through individual hardware/software interfaces. The HSI functions to effect the actual condition change of the component with which it is associated, whether that component is implemented in hardware, software, or a combination thereof.

The maintenance administrator 103 that requests a configuration change may be a person, such as a technician performing maintenance routines, or a piece of software or hardware reacting, for example, to a detected possible failure of a component within system 102 via some fault detection processes (not shown). An inputted request for a configuration change from the maintenance administrator 103 is passed to a request manager 107 within the configuration controller 101. Examples of why the condition of a component may need to be changed include: placing the component into service or taking the component out of service, replacing the component, running a diagnostic test on the component, and restarting the component. The complete set of request types will be described in detail later below.

An inputted request to change the condition of a component from one condition to another is passed to a validator 108. Validator 108 may be a piece of hardware or software that determines whether the intended request will result in a safe configuration. In particular, validator 108 examines the system as a whole to consider the side effects that may occur should the requested change in fact take place. Associated with each inputted request is a level of validation which, in the specific embodiment described herein, is an integer between one and six. Using the level of validation as one input, and the current configuration of the system as an another input, validator 108 performs a series of steps defined by a particular validation algorithm associated with the type of request inputted by the maintenance administrator 103. For example, if the request is to remove a component from service, the validation sequence of steps for that request type will query whether a backup component exists in the system that can perform the work of the to-be-removed component, and whether that backup component is in a condition that will allow it to perform the work that the to-be-removed component has been performing. The validation sequence of steps in each validation algorithm for each type of request will be described in detail hereinafter. If validation of the request fails, the request is denied and the reason for the denial is acknowledged to the request manager 107. If validation succeeds, the request is allowed and the request manager passes the request to a realizer 109. Realizer 109, through interactions through hardware/software interfaces 106 to components 104-1–104-N, performs a series of steps defined by the particular realization algorithm associated with the type of the input request. This series of steps within the particular realization algorithm associated with the type of request may affect the condition of not only the particular component upon which a change is desired, but also the conditions of other components with which that component has a relationship. Upon completion of the series of steps within the particular algorithm associated with the particular realization, acknowledgements are returned to realizer 109 from hardware/software interfaces 106, and thence to request manager 107. The set of realization algorithms associated with each type of request will be described in detail hereinafter. The set of validation algorithms and the set of realization algorithms, to be described in detail herein below, are commonly applied to the components in any replicated components system regardless of what those components are or how they function in the system as a whole. These components can be implemented in hardware, software, or a combination of both. The request manager 107, the validator 108, and the realizer 109 that together make up configuration controller 101, if implemented in software, can all be implemented on a single computer, or on multiple computers.

In order to process requests for a change in condition of any component in the system 102, certain attributes of each component type need to be provided to the configuration controller. Specifically, the conditions that a component of a particular type are permitted to be in and the type of requests that may be honored by a component of a particular type are provided to the configuration controller. It should be noted that each component can be of only one type.

Each component may have relationships with other components in the system, which inter-component relationships need to be specified to the configuration controller. As previously noted, the relationships of child, spare and mate are relationships that have been known to exist in the prior art. The inventors have discovered and defined additional relationships that can exist between components in a system. The set of the totality of defined relationships between all components are then used to determine how to process a request to change the configuration.

The additional relationship types that can exist have been determined by the inventors to be: helper, interrupt physical unit group (PUG), switch PUG, and logical unit group (LUG), which are defined as follows.

A component that is in a helper relationship with another component is used to diagnose a potential problem in the other component by performing diagnostic tests. Specifically, the helper component may provide stimuli or measure the output from the other component in the helper relationship.

The interrupt PUG defines a relationship between a group of components and a subject component where, in order to change the condition of the subject component, interrupt signals need to be inhibited from the subject component to those components in its interrupt PUG. Such interrupt signals would otherwise be sent by the subject component to these components in its interrupt PUG, which are those components with which the subject component interacts when the condition of the subject component is changed. Thus, components A, B and C are in component D's interrupt PUG if, in order to change the condition of component D, interrupt signals that would normally be sent by component D to components A, B and C, need to be inhibited. Following a change of condition of component D, the interrupt signals to its interrupt PUG will again be allowed. The inhibit PUG thus defines those components which would result in erroneous processing in the system if they received an interrupt signal from the subject component during a change of condition of the subject component.

The logical unit group relationship is similar to the sparing relationship. The logical unit group consists of a collection of components of the same type that perform the same function. The relationship is defined by a minimum number of components in the group that need to be working for the system to perform its intended functions, as well as a maximum number of components in the group that can be working at the same time.

The switch PUG relationship, similar to the aforedescribed interrupt PUG relationship, is defined between components of different types that interact with each other. If one component fails, then the other component must switch to another component with which it can interact. Thus, if component B is interacting with component A and component A is taken out-of-service, then component B needs to know to switch to another component, such as component C. The relationship between components B and A is such that component B is said to be in component A's switch PUG. Component B is also likely to be in C's switch physical unit group. Further components A and C are in the same logical unit group.

The type of component determines whether or not it may have relationships with other components. For every component type there is a list of other component types with which it may have a child. Similarly, there is a list for the helper, interrupt PUG, and switch PUG relationships. The spare, mate, and logical unit group relationships may only exist between components of the same type. Within the set of allowed relationships that a component may have, there is a subset of relationships that exist for that component. For example, a component may have a child relationship with several other components. Alternatively, one may view each relationship as containing a set of components that have a relationship.

Each component in a system may be in one and only one condition at any instance of time. The condition of a component is a combination of four independent values: a primary condition, a secondary condition, a tertiary condition, and an inhibit state. The primary condition can be one of the following: (1) working; (2) ready; (3) unready; or (4) unusable, which have been previously described. The secondary condition may be one of the following: (1) primary, (2) secondary, (3) forced; (4) automatic; (5) manual; (6) growth; or (7) null. A component in which its secondary condition is primary indicates that the component is the main component doing the work. A component in which its secondary condition is secondary is indicative that the component is doing backup work. Thus, a working.secondary component is in lock-step with a working.primary component and ready to take over should the working.primary component become faulty. A component in which its secondary condition is forced is indicative that the component has been placed in this condition and that the normal sequence of operations have been overridden to force the component to a particular condition. The automatic secondary condition is used when an entire collection of components have had their conditions changed together. Thus, for example, children components are all put into an automatic secondary condition when the condition of their parent has been changed. A manual secondary condition is used to affect a particular component. A growth secondary condition is used when a component is being added to the system and the component is in some transitional phase between where the component should eventually be and where the component presently is. The null secondary condition is indicative that there is no additional information to supply regarding the secondary condition.

Tertiary conditions may be one of the following: (1) campon; (2) degraded; (3) diagfail; (4) diagnostic; (5) facfail; (6) family of equipment; (7) farfail; (8) helper, (9) init; (10) maintiprog; (11) nearfail; (12) pwralarm; (13) pwroff, (14) roudiag; (15) trouble; (16) warming; and (17) null. A component in which its tertiary condition is campon indicates that the condition of this component cannot be changed and that some sequence of events must occur before the component can change its condition. A degraded tertiary condition indicates that the component is not performing at its normal operating level, such as for example, not operating at its proper speed. A diagfail tertiary condition indicates that a diagnostic has been run on the component and that it is a poorly functioning component. A component with a diagnostic tertiary condition indicates that a diagnostic test is currently been run on the component and that nothing should now be done to change the condition of this component. The facfail tertiary condition indicates the occurrence of a facility failure, such as a loss of power, that prevents the component from performing its function. The family of equipment tertiary condition indicates that the component cannot perform its function because it requires input from another component that has failed. A component with a helper tertiary condition has been put in this state because it is helping perform a diagnostic test on another component. A component with an init tertiary condition is initializing, such as powering up. The maintiprog tertiary condition indicates that maintenance is in progress, and that the component is in the midst of changing its condition because a routine maintenance procedure is currently being performed. A component with either a farfail or a nearfail tertiary condition has failed because some component that provides input to it has failed. The pwralarm tertiary condition indicates that there has been some power anomaly in the system, such as the power having been turned off. When the tertiary condition of a component is pwroff, it is affirmatively known that power was actually turned off. A component with the roudiag tertiary condition has been temporarily put into a diagnostic condition for routine diagnostic testing. A component with the trouble tertiary condition is malfunctioning for some unknown reason that has not yet been diagnosed. A component with a warming tertiary condition is in another kind of initialization condition. The null tertiary condition indicates that there is no additional information regarding the tertiary condition.

A component is also characterized by its inhibit state, which may be either inhibited or uninhibited. In the inhibited state, the component will not send interrupt signals to any other component if any interruption in its operations occurs. A component in the uninhibited state sends interrupt signals to all other components which are listening for such occurrences.

A request to change the condition of a component is from a fixed list of possible request types. These are: allow, de-elevate, elevate, inhibit, refresh, remove, restart, restore, resynchronize, switch, and update_condition. Each request also specifies a desired condition of the component to which the request is being applied and a level of validation. When a request is realized, the condition of the component to which the request is applied may be changed as well as the conditions of other components with which the requested component has a relationship. For each request type there is one and only algorithm that is used to effect the validation processing of that request and one and only one algorithm that is used to effect the realization processing of that request. The functions of each of the request types follow are described immediately herein below. Exemplary pseudo-code that can be used to implement the realization processing of each of the request types is presented thereafter. Descriptions of the validation processing and associated algorithms that may be performed to validate a request before such request is realized are then presented.

The allow realization operation changes the condition of a component so that the interrupt signals it may generate can propagate to other components. The de-elevate operation changes a component from active to standby. The elevate operation changes a component from standby to active. The inhibit operation changes the condition of a component so that its interrupt signals are inhibited, i.e., not propagated to other components. The refresh operation resynchronizes the system condition of a component with its actual hardware condition. The remove operation removes an active or standby component and its children components from service. The restart operation restarts a component, as in rebooting a personal computer. The restore operation restores a standby component, or a component that is not working at all, to an active component, as well as the children of that component. The resynchronize operation resynchronizes the recorded condition of a component with its "true" condition. The switch operation switches the conditions of two components that can perform the same function within the system and which are mates or spares. The update_condition operation updates the condition of a component to a requested value.

As noted, the allow operation changes the condition of a component so that its interrupts can propagate to other components in the system. Table 1 is exemplary pseudo-code that describes steps that can be used in this embodiment of the algorithm to effect the allow realization. In the pseudo-code for this realization and in all other realization and validation algorithms whose descriptions follow, the convention followed is that if a statement is true or is answered in the affirmative, then processing proceeds to next indented step. If the statement is false or is answered in the negative, then processing proceeds to next statement at the same or smaller indentation level of the first statement. Also, in the pseudo-code below and in the pseudo-code for the other realizations and validations later described, the word "unit" is used. In the context of this document, "unit" is intended to be the equivalent of the word "component" as used both above and below.

Referring now to Table 1, a determination is first made whether the allow request is a request to put the inhibit state of the subject component into a condition of inhibited, with an automatic secondary condition (line 1). If it is not, the hardware-software interface (HSI) it told to allow interrupts for that component (line 5), and the condition of the component is then changed to allow interrupts. An acknowledgment result is set to success (line 6) and an acknowledgment is sent back to the requester indicating the successful realization result (line 9). If the allow request is a request to put the inhibit state of the subject component into a condition of inhibited, with an automatic secondary condition, then a determination is made whether the current inhibit condition had previously been manually set (line 2). If it had, the change will be not be allowed and the acknowledgment result is set to failure (line 3), and reported back to the requester with a null reason (line 9).

TABLE 1

Allow Realization

1   Is the requested inhibit condition of the input request <*.automatic.*>?
2      Is the inhibit condition of the unit self?
3         Set acknowledgment result to failure, and its reason to null
4         Skip forward to [endreal]
5   Tell HSI to complete the allow realization on self unit
6   Set acknowledgment result to success, and its reason to null
7
8   -----[ endreal ]-----------------------------
9   Acknowledge input request
10  End As noted, the de-elevate operation lowers an active component to standby. Table 2 is exemplary pseudo-code that describes steps that can be used in this embodiment of the algorithm to effect the de-elevate realization. First, success is assumed and the acknowledgment result is initialized to success. The condition of the subject component is then set (line 2) to the condition specified by the request. An inhibit realization is invoked to inhibit interrupt signals to all components that might receive them from the subject component, i.e., those in the subject component's interrupt PUG (line 3). An inhibit realization is then invoked to inhibit interrupt signals from the subject component that might affect the subject component itself (line 4). A request is then sent (line 5), to the HSI to change the primary condition of the subject component from working to ready. If the request succeeds or is aborted (line 6), then a refresh realization is invoked to refresh all components related to this component by the switch PUG (i.e., they are checked to see that they have the correct condition) (line 7), and an allow realization is invoked to again allow interrupt signals from the subject component (line 8). Processing continues (line 1) and an allow realization is invoked to allow interrupt signals to all components in the subject component's interrupt PUG and success is acknowledged (line 17). If the invocation to de-elevate fails (line 10), then the subject component is removed (line 11) by invoking the remove realization for this component, and a fault detection and analysis (FDA) component (not shown) is informed that the de-elevate relation has failed (line 12). The acknowledgment result is set to failure and its reason for failure being that that the de-elevate operation on the component could not be performed (line 13). An allow realization then again allows interrupt signals to all components related to the subject component by its interrupt PUG (line 16), and the failure is reported to the requester (line 17).

TABLE 2

De-elevate Realization

1   Set acknowledgment result to success, and its reason to null
2   Set condition of self unit to condition specified by de-elevate
3   Invoke( Inhibit interrupt PUG unit )
4   Invoke( Inhibit self unit )
5   Tell HSI to complete the de-elevate realization on self unit
6   Did the invocation abort or succeed?
7      Invoke( Refresh switch PUG unit )
8      Invoke( Allow self unit )
9      Skip forward to [endreal]

TABLE 2-continued

10  Did the invocation fail?
11     Invoke( Remove self unit )
12     Tell FDA that the de-elevate realization on self unit failed
13     Set acknowledgment result to failure, and its reason to de-elevate
14
15  -----[ endreal ]-----------------------------
16  Invoke( Allow interrupt PUG unit )
17  Acknowledge input request
18  End The elevate realization changes an out-of-service standby component to an active component. Table 3 is exemplary pseudo-code that describes steps that can be used in this embodiment of the algorithm to effect the elevate realization. Firstly, an inhibit realization inhibits interrupt signals to all components that receive them from the subject component (line 1) (i.e., those other components in the subject component's interrupt PUG). Then an inhibit realization inhibits interrupt signals within the subject component itself (line 2). A request is then made to the HSI to elevate the primary condition of the component to working (line 3). If that invocation aborts, the component is left in its present condition and is not put into service. An allow realization then allows inhibit signals from the subject component and an acknowledgment result is set to aborted with a reason being the failure to elevate the component. (lines 4–6). An allow realization is then invoked to allow interrupt signals from the component's interrupt PUG and the request is acknowledged to the requester (lines 19–20). If the invocation to elevate fails, then the component is malfunctioning and a remove realization is invoked to remove the component from service (lines 8–9). The FDA is then informed of the failure so that "clean-up" can be performed later, and the acknowledgment result is set to failure (line 10–11). An allow realization is then invoked to allow interrupts to the component's interrupt PUG and the request is acknowledged (lines 19–20). If the invocation through the HSI to elevate the component succeeds, then an allow realization is invoked to allow interrupts from the component (line 13), and a refresh realization is invoked to refresh the condition of all components in the subject component's switch PUG (line 14). The condition of the subject component is then changed to the requested condition (line 15), and an allow realization is invoked to allow interrupts from the subject component to components in its interrupt PUG (line 19) and success is acknowledged to the requester (line 20).

TABLE 3

Elevate Realization

1   Invoke( Inhibit interrupt PUG unit )
2   Invoke( Inhibit self unit )
3   Tell HSI to complete the elevate realization on self unit
4   Did the invocation abort?
5      Invoke( Allow self unit )
6      Set acknowledgment result to aborted, and its reason to elevate
7      Skip forward to [endreal]
8   Did the invocation fail?
9      Invoke( Remove self unit )
10     Tell FDA that the elevate realization on self unit failed
11     Set acknowledgment result to failure, and its reason to elevate
12     Skip forward to [endreal]
13  Invoke( Allow self unit )
14  Invoke( Refresh switch PUG unit )

TABLE 3-continued

```
15   Set condition of self unit to condition specified by elevate
16   Set acknowledgment result to success, and its reason to null
17
18   -----[ endreal ]----------------------------
19   Invoke( Allow interrupt PUG unit )
20   Acknowledge input request
21   End
```

The inhibit realization changes the condition of a component so that interrupt signals are not propagated from the subject component to other components. Table 4 is exemplary pseudo-code that describes steps that can be used in this embodiment of the algorithm to effect the inhibit realization. First, a check is performed to determine if the request is one to change the condition of the component to inhibited with an automatic secondary condition when the current condition of the component is inhibited with a manual secondary condition (lines 1–3). If true, the request will not be satisfied since a system rule precludes changing the condition of a component which has been manually set since that manual setting needs to be given precedence over a subsequent request. An error is thus returned to the requester (lines 4, 5 and 10). Otherwise, if not manually set, a request is sent to the HSI to inhibit interrupt signals from the component (line 6). The condition of the component is changed so that interrupt signals are inhibited and success is acknowledged back to the requester (line 10).

TABLE 4

```
                           Inhibit Realization

1    Is the inhibit condition of the unit self?
2       Is the requested inhibit condition of the input request
3           <*.automatic.*>?
4           Set acknowledgment result to failure, and its reason to
                null
5           Skip forward to [endreal]
6    Tell HSI to complete the inhibit realization on self unit
7    Set acknowledgment result to success, and its reason to null
8
9    -----[ endreal ]----------------------------
10   Acknowledge input request
11   End
```

The refresh realization resynchronizes the system condition of a component with its actual hardware condition. Table 5 is exemplary pseudo-code that describes steps that can be used in this embodiment of the algorithm to effect the refresh realization. In this realization, the HSI is simply told to complete the refresh realization of the component, i.e., the component is asked to re-read its own internal data structure (line 1). The success of this realization is then reported to the requester (lines 2–3). This realization cannot fail.

TABLE 5

```
                           Refresh Realization

1    Tell HSI to complete the refresh realization on self unit
2    Set acknowledgment result to success, and its reason to null
3    Acknowledge input request
4    End
```

The remove realization is invoked by a the requester to take a working or ready component out-of-service and make it a standby component. This operation consists of both removing the subject component itself from service, and removing all children components of that subject component. Table 6 is exemplary pseudo-code that describes steps that can be used in an embodiment of the algorithm to effect the remove realization. Firstly, the CLIENT is informed that a remove realization of the subject component is about to begin (line 1). The CLIENT is any software running on the subject component, or running off the subject component that is dependent upon the subject component and that has registered interest as a CLIENT. Such CLIENT software that is dependent upon the subject component needs to be informed before the component is shut down to enable such software to perform clean-up operations before a remove realization of the component is effected.

A determination is then made (line 2) whether the tertiary condition of the input request is family of equipment. This step questions whether the present remove operation is being performed as a result of the removal of a parent or an ancestor of the current subject component. If it is, a determination is made whether such parent component is working or ready (line 3). If it is, the subject component (a child of that parent) does not have to be removed since a remove realization of the parent did not succeed. The operation is still treated as a success even though the subject component was not removed and the acknowledgment result is set to success (line 4). Processing of the remove realization then skips to the end of realization subroutine (endreal) (lines 45–48), where the input request is acknowledged (line 46) and the CLIENT is informed that the remove realization is about to end (line 26). If the input request is a consequence of a request to an ancestor (line 2 being true) but the condition of the subject component is unready or unusable (line 6), then the subject component is already out-of-service and removed. No further action is therefore required. The acknowledgment result is then set to success (line 7) and the afore-noted endreal subroutine is followed.

If the request to remove the subject component is not a consequence of a request to remove a parent, then (at line 9) a determination is made whether the subject component is active and in-service (working.null or working.primary). If it is, a determination is made (lines 10–11) whether the condition of a spare or mate component of the subject component is ready or working.secondary to determine whether there is another standby component is available to perform the functions of the subject component if the subject component is removed (lines 10–11). If such a component is found, then an elevate realization is invoked to elevate such a spare or mate component (line 12). A determination is then made whether that elevate realization was successful. If that realization aborts, the acknowledgment result of the remove realization is set to abort with its reason being a failure to elevate the spare or mate, and no further action is taken on the subject component (lines 13–15). Processing then proceeds to the afore-noted endreal subroutine (lines 45–46). Similarly, if the elevate realization of the spare or mate component (line 12) fails, failure is acknowledged with a reason being re-validate, to indicate that since a failure has occurred, a check needs to be performed to ensure that the system is being left in a valid configuration (lines 18–20). If no spare or mate component of the subject component is found, or if the condition of an existent spare or mate component is neither ready nor working.secondary, then a de-elevate realization is invoked (line 21) to change the subject component from a working condition to a standby condition (e.g., ready.null.null).

The invocation of a remove realization on a child component of the subject component (line 22) follows, which is reached either following the de-elevation realization of the current component, or if the condition of the current component is neither working.null nor working.primary (line 9 being false). Such a remove realization is invoked for each child component of the subject component (line 22). Thus, the remove realization is invoked for each such child of the subject component by following the above-described steps beginning at line 1 and applying them to the child component. Eventually a de-elevate realization (line 21) is invoked to de-elevate the self component, which in this realization is the child of the original subject component. The next step (line 22) then invokes a remove realization on the child of the then current component, or the child of the child. Assuming, arguendo, that there is no child of any child of the original subject component, then no invocation of a remove realization takes place and the following step (line 23) is processed. If in fact there is a child of a child of the original subject component, then the afore-described steps are reiterated.

Assuming that there are no children of any child, then the step of determining whether the invocation to remove the child of the child failed or aborted (line 23) need not be made and the associated steps on lines 24–28 are skipped. Interrupt signals are then inhibited from the child to components in its interrupt PUG (line 29) and then within the child itself (line 30). The HSI is then told to complete the remove realization of the child (line 31). A determination is then made whether that invocation failed (line 32). If it failed, the acknowledgment result is set to failure with its reason being the failure to remove the child (line 33). A determination is then made whether the condition of a child of the subject child is family of equipment. Since it has been assumed that there is no child of the child, the steps at lines 35–36 are skipped. Interrupt signal are then allowed from the child component and from the child to components in its interrupt PUG (lines 37–38) and processing continues at the end of realization (endreal) subroutine (lines 45–46). At the latter, the input request (to remove the child) is acknowledged and the CLIENT (of the child) is informed that the remove realization is about to end. If the invocation to the HSI to complete the remove realization (line 31) does not fail, so that the child is successfully removed, processing continues by setting the condition of the child to the condition specified by the remove realization of the child (line 40). Interrupts are then allowed from the child component to components in its interrupt PUG (line 41). The acknowledgment is set to success with a null reason and routine maintenance (RMTCE) is told that the remove realization of the child is completed (line 43). The remove realization of the child is then completed at the endreal subroutine (steps 45–48), by acknowledging the request (to remove the child) and telling the CLIENT of the child that the remove realization is about to end. The remove realization is then repeated for each child of the original subject component.

Once invocation of the remove realization of each child component of the original subject component has been completed, a determination is made whether that invocation aborted or failed for any child component of the original subject component (line 23). If it has, then the acknowledgment result is set to failure with a reason being the failure to remove a child of the subject component (line 24). If the tertiary condition of any child component is family of equipment (line 25), then an update realization is invoked to update the condition of that child component to the condition specified by the remove realization (line 26) for clean-up purposes. Processing then skips forward to the endreal subroutine steps (lines 45–48). If there was no failure or aborting of the remove realization for any child, then the inhibit realization is invoked on the original subject component to inhibit interrupts from the original subject component to components in its interrupt PUG and within the subject component itself (lines 29–30).

The subject component's HSI is then told to complete the remove realization on itself (line 31). A determination is then made whether that invocation failed (line 32). If it did, the acknowledgment result is set to failure with a reason being the failure to remove the component itself (line 33). A determination is then made whether the tertiary condition of any child is family of equipment (line 34). If it is, an update realization is invoked (line 35) to update the condition of each child to the condition specified by the original remove realization request. An allow realizations is then invoked on the original subject component to allow interrupts from the subject component to components in its interrupt PUG (lines 37–38). Processing then completes at the endreal subroutine (lines 45–48).

If the remove realization via the HSI succeeds (line 31), then processing continues (at line 40) and the condition of the original subject component is set to the condition specified in the original remove request. Interrupt signals are then allowed from the original component to components in its interrupt PUG (line 41). The acknowledgment result is then set to success (line 42) and RMTCE is informed that the remove realization of the original subject component is complete (line 43). The endreal subroutine (lines 45–48) then completes the remove realization by acknowledging the original input request and telling the CLIENT of the original subject component that the remove realization is about to end.

TABLE 6

Remove Realization

| | |
|---|---|
| 1 | Tell CLIENT that the remove realization is about to begin |
| 2 | Is the requested condition of the input request <*.*.family of equipment>? |
| 3 | Is the condition of the parent unit <working.*.*>or <ready.*.*>? |
| 4 | Set acknowledgment result to success, and its reason to null |
| 5 | Skip forward to [endreal] |
| 6 | Is the condition of the self unit <unready.*.*>or <unusable.*.*>? |
| 7 | Set acknowledgment result to success, and its reason to null |
| 8 | Skip forward to [endreal] |
| 9 | Is the condition of the self unit <working.null.*> or <working.primary.*>? |
| 10 | Is the condition of the spare mate unit <ready.*.*>or <working.secondary.*>? |
| 11 | |
| 12 | Invoke( Elevate spare mate unit ) |
| 13 | Did the invocation abort? |
| 14 | Set acknowledgment result to aborted, and its reason to spare mate elevate |
| 15 | |
| 16 | Skip forward to [endreal] |
| 17 | Did the invocation fail? |
| 18 | Set acknowledgment result to failure, and its reason to re-validate |
| 19 | |
| 20 | Skip forward to [endreal] |
| 21 | Invoke( De-elevate self unit ) |
| 22 | Invoke( Remove child unit ) |
| 23 | Did the invocation abort or fail? |
| 24 | Set acknowledgment result to failure, and its reason to child remove |
| 25 | Is the condition of the child unit <*.*.family of equipment>? |
| 26 | Invoke( Update condition of child unit to condition specified by remove |
| 27 | |
| 28 | Skip forward to [endreal] |

TABLE 6-continued

| | |
|---|---|
| 29 | Invoke( Inhibit interrupt PUG unit ) |
| 30 | Invoke( Inhibit self unit ) |
| 31 | Tell HSI to complete the remove realization on self unit |
| 32 | Did the invocation fail? |
| 33 |     Set acknowledgment result to failure, and its reason to remove |
| 34 |     Is the condition of the child unit <*.*.family of equipment>? |
| 35 |         Invoke( Update condition of child unit to condition ) |
| 36 |             specified by remove |
| 37 |     Invoke( Allow self unit ) |
| 38 |     Invoke( Allow interrupt PUG unit ) |
| 39 |     Skip forward to [endreal] |
| 40 | Set condition of self unit to condition specified by remove |
| 41 | Invoke( Allow interrupt PUG unit ) |
| 42 | Set acknowledgment result to success, and its reason to null |
| 43 | Tell RMTCE that the remove realization on the self unit completed |
| 44 | |
| 45 | -----[ endreal ]---------------------------- |
| 46 | Acknowledge input request |
| 47 | Tell CLIENT that the remove realization is about to end |
| 48 | End |

The restart realization restarts a component to re-initialize the condition of the component to the condition it was in when it was turned on. Table 7 is exemplary pseudo-code that describes steps that can be used in an embodiment of the algorithm to the effect the restart realization. First, the acknowledgement result is set to success (line 1) and the inhibit realization is invoked on the component (line 2) to halt the propagation of interrupt signals from the subject component. The HSI is then told to restart the component, i.e., to re-set values in the component to their initial states (line 4). If the attempt to restart via the HSI aborts (line 4), then likely there is a fault in the subject component and the component needs to be removed by invoking the remove realization (line 5) on that component. The FDA is then informed that the restart realization of that component failed (even though it only aborted) and the acknowledgment result is changed to aborted, with a reason of null (lines 6 and 7). That result is then provided to the requester (line 17). If the attempt to restart via the HSI fails (line 9), then the component is removed (line 10) and the FDA is told that the restart realization has failed (line 11). The acknowledgment result is then changed to failure (line 12) and the requester is informed of that result (line 17). If the HSI operation succeeds, interrupt signals are allowed to again propagate from the component by invoking the allow realization (line 14). The previously set acknowledgment result of success is then sent to the requester (line 17).

TABLE 7

Restart Realization

| | |
|---|---|
| 1 | Set acknowledgment result to success, and its reason to null |
| 2 | Invoke( Inhibit self unit ) |
| 3 | Tell HSI to complete the restart realization on self unit |
| 4 | Did the invocation abort? |
| 5 |     Invoke( Remove self unit ) |
| 6 |     Tell FDA that the restart realization on self unit failed |
| 7 |     Set acknowledgment result to aborted, and its reason to null |
| 8 |     Skip forward to [endreal] |
| 9 | Did the invocation fail? |
| 10 |     Invoke( Remove self unit ) |
| 11 |     Tell FDA that the restart realization on self unit failed |
| 12 |     Set acknowledgment result to failure, and its reason to null |
| 13 |     Skip forward to [endreal] |

TABLE 7-continued

| | |
|---|---|
| 14 | Invoke( Allow self unit ) |
| 15 | |
| 16 | -----[ endreal ]---------------------------- |
| 17 | Acknowledge input request |
| 18 | End |

The restore realization restores a non-working component to a working condition. As an example, the restore realization restores an unready component to a ready or working condition. Table 8 is exemplary pseudo-code that describes steps that can be used in an embodiment of the algorithm to effect the restore realization. The first step in the restore realization determines whether the primary condition of a parent of the subject component is unready (line 1). If the parent of the subject component is unready, no attempt need be made to restore the subject component to a higher condition. Thus, if the subject component's parent is unready, the condition of subject component (primary, secondary and tertiary) is set to the condition (primary, secondary and tertiary) of its unready parent (line 2). The acknowledgment result is set to success (line 3) and the requester of the realization is acknowledged. If parent is not unready, the CLIENT is told that the restore realization is about to begin so that software that may be running can complete its current functioning (line 6). Interrupts are then inhibited from the subject component to components in its interrupt PUG (line 7).

The HSI is then told to complete the restore realization on the subject component to bring it to a ready condition (line 9). If that invocation fails (line 10), the acknowledgment result is set to failure, with its reason being the failure to restore the component. Processing then jumps to a failure subroutine (fail) (lines 77–82). Upon failure, a remove realization is invoked to remove the subject component (line 78). The fault detection and analysis (FDA) is then informed that the restore realization of the subject component has failed (line 79), and the input request is acknowledged as a failure (line 80). The CLIENT is then told that the restore realization is about to end (line 81). The restore realization is then complete (line 82). If the invocation to the HSI to complete the restore realization does not fail (line 9), then processing continues by invoking an allow realization to allow interrupt signals from the subject component to components in its interrupt PUG (line 13). The condition of the subject component is then set to the condition specified in the original restore request (line 14). Interrupts are then allowed from the subject component (line 15). An update realization is then invoked to update the condition of the parent to the condition specified by the restore request to make the parent's condition consistent with that of its child.

At this point, the component being restored is either in a ready condition or a working.secondary condition. A determination is now made whether the subject component is the type of component that should have its children restored when it is in this type of condition (line 18). This is determined by a parameter associated with the subject component's type that is specified when the system as a whole is defined. If the subject component is that type of component, then a restore realization is invoked for each child of the subject component (line 21). Thus, the present restore realization (starting at line 1) is invoked as it is applies to each child of the subject component. The same processing steps previously applied to the original subject component are now applied to the child. Thus, firstly, a determination is made whether the primary condition of the parent of the child is unready (line 1), where the parent of the child thus devolves back to the original subject component. Since the condition of the subject component is known not to be unready, processing continues with the CLIENT of the child being told that the restore realization of the child is to begin (line 6). The previously described steps are then processed as they apply to the child, with the HSI being directed to complete the restore realization of the child (line 9). Such invocation either succeeds or fails. If it fails, the acknowledgment result is set to failure for the restore realization of the child component (line 11). The steps within the fail subroutine (lines 77–82) are then followed as they apply to the child, including invoking a remove realization (line 78) of the child.

If the HSI succeeds in restoring the child, the previously described steps (allowing interrupts from the child to components in its interrupt PUG, setting the condition of child to a specified condition, and allowing interrupts from within the child itself) (lines 13–15) are processed as applied to the child component. The invocation of the update realization (line 16) is then applied to the parent of the child, i.e., the subject component itself. A determination is next made whether the children of the child should be restored when condition of the child is ready.null or working.secondary (line 18). Since it has been assumed for purposes of the present discussion that no child has a child, processing skips forward to the next step at that same indent level.

A determination is then made whether the requested condition of the child is ready.null or working.secondary (line 31). If it is, the restore realization of the child has been effectively accomplished and processing skips forward to the success subroutine (line 68–69). The acknowledgment result for the child is then set to success (line 69). The end restore (endrst) subroutine (lines 71–75) is then processed by telling routine maintenance (RMTCE) that the restore realization for the child has been completed (line 72), acknowledging the input request as applied to the child (line 73), and telling the child's CLIENT that the restore realization of the child is about to end.

If, on the other hand, the requested condition of the child in neither ready.null nor working.secondary (line 31), then an elevate realization is invoked on the child (line 34) to bring the condition of the child to working.null or working.primary. If that invocation to elevate fails (line 35), the acknowledgment result is set to failure with its reason being the failure to self elevate the child component (line 36). Processing next continues at the endrst subroutine (lines 71–75), telling RMTCE that the restore realization on the child has been completed, acknowledging the input request (a failure to restore the child), and telling the child's CLIENT that the restore realization is about to end. If the invocation to elevate does not fail, but aborts (line 38), the acknowledgment result is set to aborted with the reason being a failure to elevate the child. The steps in the previously noted endrst subroutine are then followed. If the elevate realization succeeds, then the child is placed into a working.null or working.primary condition.

A determination is then made whether the children of this component should be restored when the condition of the component is working.null or working.primary (line 41). Since the child has no children, processing continues skips forward (to line 54) to determine whether the LUG maximum availability check fails. This test determines whether too many components of the same type are currently in service. If such checks do in fact fail, a further determination is made whether a spare or mate to this child is in a working.null or working.primary condition (line 55). If yes, a de-elevate realization is invoked on such spare or mate to the child (line 57). If that de-elevate realization fails (line 58), the acknowledgment result for the child is set to failure with its reason being the failure to de-elevate a spare or mate (line 59). Processing then skips forward to the endrst subroutine. Similarly, a determination is made whether the de-elevate realization aborted (line 62). If yes, the acknowledgment result is set to aborted with its reason being the failure to de-elevate a spare or mate (line 63). If the de-elevate realization of the spare or mate neither failed nor aborted, then the de-elevate realization succeeded (line 66), and processing continues at the success subroutine (lines 68–69) to complete processing of the child there and at the succeeding endrst subroutine (lines 71–75).

If the LUG maximum availability checks fails (line 54), but the condition of the spare or mate component is neither working.null or working.primary (line 55), success is assumed and processing of the child continues at the success and endrest subroutines. Similarly, if the LUG maximum availability checks did not fail (line 54), then success is assumed and processing immediately proceeds to the success and endrst subroutines. Once processing of a child of the original subject component is completed, the same procedures are then followed for each other child of that subject component being restored.

Once the restore realization has been invoked for each child of the original subject component (line 21), a determination is made whether the restore realization failed for any child (line 22). If it did, the acknowledgment result is set to failure and the reason being a failure to restore all of the children. Processing skips forward to the fail subroutine (lines 77–82), applying that subroutine now to the original subject component. If the restore realization did not fail for any child but aborted (line 26), then the acknowledgment result is set to aborted with a reason being a failure to restore all the children. Processing then moves to the endrst subroutine (lines 71–75), applying its previously described steps to the original subject component. If the restore realization of all the children neither fails nor aborts, then it has succeeded and the condition of the original subject component is set to that condition specified by the original restore request (line 30). A determination is then made whether the condition of the input request is ready.null or working.secondary (line 31). If it is, processing skips to the success and endrst subroutines, thereby completing the restore realization of the original subject component and its children.

If the condition of the input request is neither ready.null nor working.secondary (line 31), then an elevate realization is invoked the for the subject component (line 34). If that elevate realization fails (line 35), the acknowledgment result is set to failure with the reason being the failure to elevate the current component (line 39). Processing then continues at the endrst subroutine. If that elevate realization aborts (line 38), the acknowledgment result is set to aborted for the same reason.

If the elevate realization neither fails nor aborts, then it has succeeded and processing continues to now determine whether the children of the component should be restored when the condition of the component is workng.null or working.primary (line 41). Since, to have reached this point, the children have already been successfully restored, the answer must be no. Processing then continues (line 54) by determining whether the LUG maximum availability checks fail as applied to the original subject component. If they do, then a determination is made whether the condition of the spare or mate of the original subject component is working.null or working.primary (line 55). If it is, the previously described steps on lines 57–66 are applied to the spare or mate, de-elevating such spare or mate of the original subject component. Upon success of the latter operation, the acknowledgment result of the original restore request is set to success through the success subroutine (line 68–69), and the endrst subroutine (lines 71–75) to complete the restore realization. If the de-elevate realization of the spare or mate fails or aborts, then the acknowledgment result is set to failure or aborted, respectfully, and the endrst subroutine completes the restore realization. If the condition of the spare or mate of the original subject component is neither working.null nor working.primary, or if the LUG maximum availability checks do not fail, then the success and endrst subroutines are followed to successfully complete the restore realization.

It has heretofore been assumed that the children of the subject component should affirmatively be restored when the component is ready null or working.secondary (line 18). If the children should not be restored, then processing continues by next determining whether the requested condition for the restore realization of the original subject component is ready.null or working.secondary (line 31). If yes, processing skips to the success subroutine, and the restore realization is completed without restoring any child of the subject component. If it isn't, then an elevate realization is invoked on the subject component (line 34). If this elevate realization does not fail or abort, then a determination is made whether the children of the original subject component should be restored when the subject component is working.null or working.primary (line 41). If they should, a restore realization is invoked for each child (line 44) in a manner described above, starting at line 1. If that invocation fails or aborts, the fail or endrst subroutines are respectively followed. If each child is successfully restored, then the condition of the original subject component is set to the condition specified by the elevate request (line 53). As previously described, the LUG maximum availability checks are performed (line 54), which may invoke a de-elevate realization of a spare or mate of the original component. If the children of the original subject component should not be restored when the component is working.null or working.primary (line 41), then processing proceeds directly to the LUG maximum availability checks (line 54) as described above for possible invocation of a de-elevate realization of a spare or mate of the original component.

TABLE 8

Restore Realization

| | |
|---|---|
| 1 | Is the condition of the parent unit <unready.*.*>? |
| 2 | Set condition of self unit to condition specified by parent unready |
| 3 | Set acknowledgment result to success, and its reason to null |
| 4 | Acknowledge input request |
| 5 | End |
| 6 | Tell CLIENT that the restore realization is about to begin |
| 7 | Invoke( Inhibit interrupt PUG unit ) |
| 8 | Set phase to initializing |
| 9 | Tell HSI to complete the restore realization on self unit |
| 10 | Did the invocation fail? |
| 11 | Set acknowledgment result to failure, and its reason to self restore |
| 12 | Skip forward to [fail] |
| 13 | Invoke( Allow interrupt PUG unit ) |
| 14 | Set condition of self unit to condition specified by restore |
| 15 | Invoke( Allow self unit ) |

TABLE 8-continued

| | |
|---|---|
| 16 | Invoke( Update condition of parent unit to condition specified |
| 17 | by restore |
| 18 | Should the children of the unit be restored when the unit is |
| 19 | <ready.*.*>or <working.secondary.*>? |
| 20 | Set phase to initializing |
| 21 | Invoke( Restore child unit ) |
| 22 | Did the invocation fail? |
| 23 | Set acknowledgment result to failure, and its reason to |
| 24 | child restore |
| 25 | Skip forward to [fail] |
| 26 | Did the invocation abort? |
| 27 | Set acknowledgment result to aborted, and its reason to |
| 28 | child restore |
| 29 | Skip forward to [endrst] |
| 30 | Set condition of self unit to condition specified by restore |
| 31 | Is the requested condition of the input request <ready.*.*> or |
| 32 | <working. secondary.*>? |
| 33 | Skip forward to [success] |
| 34 | Invoke( Elevate self unit ) |
| 35 | Did the invocation fail? |
| 36 | Set acknowledgment result to failure, and its reason to self elevate |
| 37 | Skip forward to [endrst] |
| 38 | Did the invocation abort? |
| 39 | Set acknowledgment result to aborted, and its reason to self elevate |
| 40 | Skip forward to [endrst] |
| 41 | Should the children of the unit be restored when the unit is |
| 42 | <working.null.*> or <working.primary.*>? |
| 43 | Set phase to initializing |
| 44 | Invoke( Restore child unit ) |
| 45 | Did the invocation fail? |
| 46 | Set acknowledgment result to failure, and its reason to |
| 47 | child restore |
| 48 | Skip forward to [fail] |
| 49 | Did the invocation abort? |
| 50 | Set acknowledgment result to aborted, and its reason to |
| 51 | child restore |
| 52 | Skip forward to [endrst] |
| 53 | Set condition of self unit to condition specified by elevate |
| 54 | Did the LUG maximum availability checks fail? |
| 55 | Is the condition of the spare mate unit <working.null.*> or |
| 56 | <working.primary. *>? |
| 57 | Invoke( De-elevate spare mate unit ) |
| 58 | Did the invocation fail? |
| 59 | Set acknowledgment result to failure, and its reason |
| 60 | to spare mate de-elevate |
| 61 | Skip forward to [endrst] |
| 62 | Did the invocation abort? |
| 63 | Set acknowledgment result to aborted, and its reason |
| 64 | to spare mate de-elevate |
| 65 | Skip forward to [endrst] |
| 66 | Skip forward to [success] |
| 67 | |
| 68 | -----[ success ]---------------------------- |
| 69 | Set acknowledgment result to success, and its reason to null |
| 70 | |
| 71 | -----[ endrst ]---------------------------- |
| 72 | Tell RMTCE that the restore realization on the self unit completed |
| 73 | Acknowledge input request |
| 74 | Tell CLIENT that the restore realization is about to end |
| 75 | End |
| 76 | |
| 77 | -----[ fail ]---------------------------- |
| 78 | Invoke( Remove self unit ) |
| 79 | Tell FDA that the restore realization on self unit failed |
| 80 | Acknowledge input request |
| 81 | Tell CLIENT that the restore realization is about to end |
| 82 | End |

The resynchronize operation resynchronizes the recorded condition of a component with its "true" hardware condition. It causes a component to check its own internal data with respect to its condition and compare it with the condition that the requester thinks the component is in. Table 9 is exemplary pseudo-code that describes steps that can be used in this embodiment of the algorithm to effect the resynchronize realization. The HSI is first told to resynchronize the component (line 1). Thus a condition which the requester believes the component to be in is given to the HSI and a check is performed to determine whether the component is actually in that condition. If that invocation succeeds (line 3), the acknowledgment result is set to success (line 3) and the condition of the component is set to the condition specified by the resynchronize realization (line 4). Processing then skips forward to the end of realization (endreal) subroutine (line 13–16), where the FDA is informed that the component has been resynchronized (line 14), and the input request is acknowledged (line 15). If the invocation to the HSI aborts (line 6), then the acknowledgment result is set to aborted with its reason being a failure to resynchronize (line 7). Processing then skips forward to the endreal subroutine and the FDA is told of the abort result of the resynchronize realization. If the invocation to the HSI fails (line 9), then the acknowledgment result is set to failure with its reason being a failure to resynchronize (line 10). Processing concludes with the endreal subroutine, the FDA being told of the failure of the resynchronize realization.

TABLE 9

Resynchronize Realization

1   Tell HSI to resynchronize this unit
2   Did the invocation succeed?
3     Set acknowledgment result to success, and its reason to null
4     Set condition of self unit to condition specified by
          resynchronize
5     Skip forward to [endreal]
6   Did the invocation abort?
7     Set acknowledgment result to aborted, and its reason to resynch
8     Skip forward to [endreal]
9   Did the invocation fail?
10    Set acknowledgment result to failure, and its reason to resynch
11    Skip forward to [endreal]
12
13  -----[ endreal ]-----------------------------
14  Tell FDA that the resynchronize realization on self unit has
          completed
15  Acknowledge input request
16  End The switch realization is used to change the conditions of two components that can perform the same functions within the system, one component being working (working.null or working.primary) and one component being a standby component (ready.null or working.secondary), so that their roles are reversed. These two components must be mates or spares. The switch realization is invoked on the working component to change its secondary condition to secondary and to change the primary condition of its mate or spare to working. Table 10 is exemplary pseudo-code that describes steps that can be used in this embodiment of the algorithm to effect the switch realization. The first step tells the CLIENT that the switch realization is about to begin (line 1). The acknowledgment result is initialized by setting it to success (line 2). An elevate realization is then invoked on the spare or mate (usually a mate) (line 3) to change the condition of the component that was not the primary one. A determination is made whether that invocation succeeded (line 4). If it did (line 5), a de-elevate realization is invoked on the other component (line 5). Processing then skips forward to the endreal subroutine (lines 14–17) where the input request is acknowledged (line 15) and the CLIENT is informed that the switch realization is about to end (line 16). If the elevate realization aborts (line 7), the acknowledgment result is changed to aborted with its reason being a failure to elevate the spare or mate component (line 8). Processing then concludes with the endreal subroutine, as described. If the elevate realization fails (line 11), then the acknowledgment result is set to failure and its reason being re-validate (line 12), so that the configuration of the system can be checked when the realization is completed. The realization is then completed with the endreal subroutine.

TABLE 10

Switch Realization

1   Tell CLIENT that the switch realization is about to begin
2   Set acknowledgment result to success, and its reason to null
3   Invoke( Elevate spare mate unit )
4   Did the invocation succeed?
5     Invoke( De-elevate self unit )
6     Skip forward to [endreal]
7   Did the invocation abort?
8     Set acknowledgment result to aborted, and its reason to
          spare mate elevate
10    Skip forward to [endreal]
11  Did the invocation fail?
12    Set acknowledgment result to failure, and its reason to
          re-validate
13
14  -----[ endreal ]-----------------------------
15  Acknowledge input request
16  Tell CLIENT that the switch realization is about to end
17  End The update operation is used to change the condition of a component to a specified condition. Table 11 is exemplary pseudo-code that describes steps that can be used in this embodiment of the algorithm to effect the update realization. The update realization never fails. The acknowledgment result is set to success (line 1) and the condition of the component is set to the condition specified by the request (line 2). The input request is then acknowledged (line 3).

TABLE 11

Update Realization

1   Set acknowledgment result to success, and its reason to null
2   Set condition of self unit to condition specified by requested
          condition
3   Acknowledge input request
4   End Prior to the invocation of a realization operation, in the embodiment of the present invention described herein, a validation check is performed to determine whether that realization should in fact be invoked. Accompanying every request is an associated validation level, which may be associated with the requester who is making the request. In the specific embodiment of the present invention, the validation level varies between one and six, with a validation level of one requiring the lowest degree of validation and a validation of six requiring the highest degree of validation. For every request, based in part on that validation level and the current configuration of the system, some validation procedure is performed to determine whether in fact a realization of that request should be performed. For example, if a request to invoke a remove realization on a component is invoked, a remove validation is first invoked to determine whether a backup component exists to perform the work of the component to be removed and whether such backup component is in a condition to perform that work.

A validation procedure, depending upon the type of realization request, may be either a trivial procedure that blankly authorizes the realization to proceed, or may be a specific algorithm that is performed to determine whether or not the request is authorized to proceed to a realization. A validation either succeeds or fails. If it succeeds, the request is allowed and the appropriate realization algorithm is then executed. If the validation fails, the request is denied and no attempt is made to invoke the associated realization. A reason why the request has been denied is then reported back to the requester. Described herein below are six algorithms associated with realization operations previously described which require specific validation before a realization can be invoked. As will be described, each algorithm consists of a series of steps. Within each algorithm, if at any point an indication of invalidity is produced, further validity processing is halted and a realization operation is not invoked. In the specific embodiment of the invention, the realizations that do not have associated validation algorithms have blanket authorization to directly proceed to a realization algorithm without needing a prior successful validation.

The allow validation is invoked prior to an allow realization. The allow operation, as previously noted, is a request to allow interrupt signals to propagate from a component. Table 12 is an example of pseudo-code that can be used for the allow validation. The first step determines whether the level of validation is one, requiring the lowest degree of checking (line 1). If yes, the operation automatically succeeds and the acknowledgment result is set to success (line 2). Processing then proceeds to the end of validation (endval) subroutine (lines 12–14) where the input request is acknowledged and whereupon the allow realization is invoked. If the level of validation is not one, then a determination is made whether the inhibit state of the component has been manually set (line 4). If it has, then a determination is made whether the primary condition of the component is unready or unusable. If it is, then interrupt signals should not be allowed to propagate, and the acknowledgment result is set to failure with its reason to chkself, indicating that the self condition did not allow it (line 6). The endval subroutine then acknowledges the input request, precluding invocation of the allow realization. If the condition of the component is neither unready or unusable, then the acknowledgment result is set to success (line 8) and processing concludes with the endval subroutine, permitting the allow realization to proceed. If the inhibit state was not manually set, then the acknowledgment result is set to failure, preventing invocation of the allow realization (line 10). This prevents changing the inhibit state of a component that might be in transition due to some other occurring realization algorithm that could change the inhibit state of the component during its processing.

TABLE 12

```
==================================================
                  Allow Validation
==================================================
1   Is the requested level of validation = 1?
2     Set acknowledgment result to success, and its reason to null
3     Skip forward to [endval]
4   Is the inhibit condition of the unit self?
5     Is the condition of the self unit <unready.*.*> or
              <unusable.*.*>?
6       Set acknowledgment result to failure, and its reason to
              chkself
7       Skip forward to [endval]
```

TABLE 12-continued

```
8     Set acknowledgment result to success, and its reason to null
9     Skip forward to [endval]
10    Set acknowledgment result to failure, and its reason to chkself
11
12  -----[  endval  ]-----------------------------
13  Acknowledge input request
14  End
```

The refresh validation is performed prior to a refresh realization, which is a request to have the component check its own internal data to look at its own condition. In general, such an operation will almost always be allowed. Table 13 is in example of pseudo-code that can be used for the refresh validation. The first step determines whether the primary condition of the component is working or ready. If it is, the acknowledgment result is set to success (line 2) and the input request is acknowledged, thereby allowing the refresh realization to proceed (line 7). If the condition of the component is neither working nor ready, then it must be in an unready or unusable condition, which might imply that the component is malfunctioning. In such a case, the component should not refresh itself since it might do so incorrectly. Thus, the acknowledgment result is set to failure, precluding invocation of the refresh realization (line 4), with the reason being that the condition of the component itself has been checked. It should be noted that the refresh validation is independent of the value of the validation level.

TABLE 13

```
==================================================
                 Refresh Validation
==================================================
1   Is the condition of the self unit <working.*.*> or <ready.*.*>?
2     Set acknowledgment result to success, and its reason to null
3     Skip forward to [endval]
4   Set acknowledgment result to failure, and its reason to chkself
5
6   -----[  endval  ]-----------------------------
7   Acknawledge input request
8   End
```

Before a remove realization is invoked to remove a component from service, a remove validation is performed. As previously described, a remove request is a request to take a working component out of service to a ready or unready condition, or to whatever condition is specified in the request. Table 14 is exemplary pseudo-code that can be used to effect the remove validation. The first step determines whether the requested level of validation is one (a request that requires the lowest degree of validation) (line 1). If it is, nothing further is need be done in the validation processing, and the acknowledgment result is set to success (line 2). Processing then skips to the endval subroutine (lines 80–82), where the input request is acknowledged and a remove realization is performed. If the requested level of validation is not one, a determination is made whether the requested level of validation is greater than or equal to six (six requiring the highest level of validation) (line 4). In the embodiment herein, a validation level of six implies that the component upon which the remove request is being made has been acting in a suspicious manner, which has been noted by a technician or fault detection circuitry, and that the remove request is being performed to enable a diagnostic test to be performed on the component. If it is, a determination is made whether a diagnostic test on the subject component can in fact be performed. This, in turn, is determined by whether or not the subject component has helper components (line 5). If the subject component has no such helper components, then the acknowledgment result is set to failure (line 7), since without a helper component, a diagnostic test cannot be performed. Processing then skips to the endval subroutine and the remove realization is not performed. If the subject component has one or more helper components (line 6), the processing skips forward to the helper subroutine (lines 10–17).

Within the helper subroutine, another validation is invoked (validations only invoke validations and realizations only invoke realizations). Specifically, for each helper component, a remove validation is invoked, with a validation level of five (line 11). For each such validation, a determination is made whether that invocation failed (line 12). If it fails, then the acknowledgment result of the remove validation of the subject component is set to failure for the reason of checking the helper (line 13). Processing then skips to the endval subroutine. Thus, if the remove validation for any helper component of the subject component fails, then the validation of the subject component fails. Similarly, if the remove validation for any helper component aborts (line 15), the acknowledgment result is set to aborted (line 16), thereby aborting the remove validation of the subject component.

If the remove validation for each helper component succeeds (from line 11), or if the requested level of validation is less than six (but greater than one) (from line 4), a determination is made whether the request is a descendent of an original request (line 18). In other words, a determination is made whether the present request is an original validation request or is the descendent of some other validation request. If it is a descendent, a determination is made whether the primary condition of the parent of the subject component is working or ready (line 19). If it is, the acknowledgment result is set to success (line 20) since this is a "healthy" state for the component to be in, and the remove realization can likely proceed with implied impunity. Processing then skips forward to the endval subroutine (line 21).

If the primary condition parent of the subject component is neither working nor ready (line 19), or if the request is not a descendent of an original request (line 18) but is an original request, then a determination is made whether the tertiary condition of the component is either diagnostic or interdiag (line 22). These conditions are indicative that the component is in a diagnostic state and that a negative event has occurred. A determination is then made whether the requested level of validation is greater than or equal to three (line 24). If it is, the acknowledgment result is set to failure (line 25) and processing skips to the endval subroutine (line 26), and the remove realization is precluded. If the requested level of validation is not greater than or equal or three (and greater than one), or, in other words, equal to two, then the acknowledgment result is set to success (line 27) and processing skips to the endval subroutine (line 26), allowing the remove realization to proceed.

If the subject component is not in a diagnostic condition (line 22 being false), processing then determines whether the tertiary condition of the component is in a pwralarm or pwroff condition (line 29), neither of which are "good" conditions to be in. If it is in either such condition, a determination is made whether the level of validation is six (line 30). If it is, then the acknowledgment result is set to succeed (line 31), since it is known that a diagnostic test is going to be performed. If the level of validation is less than six, however, then the acknowledgment result is set to failure (line 33) with a reason that the power has been checked (chkpwr), since in a power-off condition, one cannot do anything with the component.

If the tertiary condition of the component is neither pwralarm nor pwroff (line 29), then a determination is made whether the secondary condition of the component is growth (line 35), i.e. it is in some state where the component is warming up. If it is, the acknowledgment result is set to success (line 36), since the likelihood of a deleterious effect on the system is small and the remove realization of the component can proceed. If the secondary condition is not growth, a determination is made whether the primary condition of the component is unusable, i.e., truly not working (line 38). If it is, a determination is made whether the requested level of validation is greater than or equal to six (i.e., a diagnostic test is going to be performed on the component) (line 39). If it is, then the acknowledgment result is set to success and the remove realization can proceed (line 40). If the requested level of validation is less than six (but greater than one), the acknowledgment result is set to failure and the remove realization is not invoked (line 42).

A sequence of tests are then performed, the failure of any one of which will cause the failure of the validation. The first test determines whether the tertiary condition of the component is maintiprog (line 44). This condition is indicative that some kind of routine testing is presently in progress, and a component in such a testing condition would not be interrupted for its removal. The next test determines whether the tertiary condition of the component is campon (line 47). The campon condition is a condition imposed on a working component while it awaits some other event. A component would not be removed while it is in such a condition. The next test determines whether the tertiary condition of the component is update (line 50). The update condition is indicative that the system is in the middle of updating another component's condition, which will have an effect on the subject component. Again, a component would not be removed while it is in this update condition.

If the component does not fail any of these previously described tests, a determination is made whether the primary condition of the component is unready (line 53). Since that is the condition that the component should be in when it is removed, the acknowledgment result is set to success (line 54) and processing concludes at the endval subroutine, allowing the remove realization to proceed.

If the previous steps have neither resulted in the success or failure of the remove validation, a determination is made whether the requested level of validation is greater than or equal to five (line 56). This implies that much is presently ongoing. A determination is then made whether the condition of a spare or mate to the subject component is either working or ready (line 57) in order to ascertain that some spare or mate is available to assume the functions of the subject component should the subject component be removed. A determination is then made whether the condition of the spare or mate is invalid for elevate (line 58), i.e., whether the spare or mate cannot be elevated. If it cannot, the acknowledgment result is set to failure (line 59). If it is not invalid, then processing continues with respect to that spare or mate in the spare subroutine (lines 66–78) to determine whether, by changing the condition of the spare or mate, other problems will be created.

Within the spare subroutine, a determination is made whether the LUG minimum availability check fails (line 68) to determine that the minimum number of components of that subject component's type will be working. If there will not be enough working components, the acknowledgment result is set to failure to prevent the removal of the subject component. If the LUG minimum availability check passes, a remove validation of each child (if such child exists) of the subject component is invoked (line 70). If the remove validation for any of the children fails (line 71), then a determination is made whether the reason for the failure was a power condition (line 72). If it is, the acknowledgment result is set to failure for the reason of failing to be able to remove the child. If the reason is not a power condition, but some other reason, then processing is allowed to continue. A determination is then made whether the LUG functionality checks succeed (line 75). These tests are special set of checks associated with the connectivity between components to determine whether the remove operation will put the system into an undesirable configuration. If these tests are passed, the acknowledgment result is set to success (line 76) and processing concludes at the endval subroutine. If these tests fail, the acknowledgment results is set to failure.

If the requested level of validation is less than five (but greater than one) (line 56), processing skips directly to the spare subroutine for the above-described tests. If the requested level of validation is greater than or equal to five, but the condition of the spare or mate in neither working nor ready (line 57), then the spare or mate will not be able to elevated, and the acknowledgment result is set to failure (line 63).

TABLE 14

```
==================================================
                   Remove Validation
==================================================
 1  Is the requested level of validation
 2    Set acknowledgment result to success, and its reason to null
 3    Skip forward to [endval]
 4  Is the requested level of validation >= 6?
 5    Are there helper units for this unit?
 6      Skip forward to [helper]
 7    Set acknowledgment result to failure, and its reason to chkhlpr
 8    Skip forward to [endval]
 9
10  -----[ helper ]-----------------------------
11  Invoke( Remove helper unit, Level 5 )
12  Did the invocation fail?
13      Set acknowledgment result to failure, and its reason to
            chkhlpr
14      Skip forward to [endval]
15  Did the invocation abort?
16      Set acknowledgment result to aborted, and its reason to
            chkhlpr
17      Skip forward to [endval]
18  Is this request a descendant of the original request?
19    Is the condition of the parent unit <working.*.*> or <ready.*.*>?
20      Set acknowledgment result to success, and its reason to null
21      Skip forward to [endval]
22  Is the condition of the self unit <*.*.diagnostic failed> or
23      <*.*.interactive diagnostic>?
24    Is the requested level of validation >= 3?
25      Set acknowledgment result to failure, and its reason to
            chkdgn
26      Skip forward to [endval]
27    Set acknowledgment result to success, and its reason to null
28    Skip forward to [endval]
29  Is the condition of the self unit <*.*.power alarm> or <*.*.power
        off>?
30    Is the requested level of validation >= 6?
31      Set acknowledgment result to success, and its reason to null
32      Skip forward to [endval]
33    Set acknowledgment result to failure, and its reason to chkpwr
34    Skip forward to [endval]
35  Is the condition of the self unit <*.growth.*>?
36    Set acknowledgment result to success, and its reason to null
37    Skip forward to [endval]
38  Is the condition of the self unit <unusable.*.*>?
```

TABLE 14-continued

```
39    Is the requested level of validation >= 6?
40      Set acknowledgment result to success, and its reason to null
41      Skip forward to [endval]
42    Set acknowledgment result to failure, and its reason to chkunuse
43    Skip forward to [endval]
44  Is the condition of the self unit <*.*.maintenance in progress>?
45    Set acknowledgment result to failure, and its reason to chkmip
46    Skip forward to [endval]
47  Is the condition of the self unit <*.*.campon>?
48    Set acknowledgment result to failure, and its reason to chkcampon
49    Skip forward to [endval]
50  Is the condition of the self unit <*.*.update>?
51    Set acknowledgment result to failure, and its reason to chkupdate
52    Skip forward to [endval]
53  Is the condition of the self unit <unready.*.*>?
54    Set acknowledgment result to success, and its reason to null
55    Skip forward to [endval]
56  Is the requested level of validation >= 5?
57    Is the condition of the spare mate unit <working.*.*> or
          <ready.*.*>?
58      Is the condition of the spare mate unit invalid for elevate?
59        Set acknowledgment result to failure, and its reason
60            to chkmate
61        Skip forward to [endval]
62      Skip forward to [spare]
63    Set acknowledgment result to failure, and its reason to chkmate
64    Skip forward to [endval]
65
66  -----[ spare ]-----------------------------
67  Did the LUG minimum availability checks fail?
68    Set acknowledgment result to failure, and its reason to minavail
69    Skip forward to [endval]
70  Invoke( Remove child unit )
71  Did the invocation fail?
72    Was the reason for the failure chkpwr?
73      Set acknowledgment result to failure, and its reason to
            chkchild
74      Skip forward to [endval]
75  Did the LUG functionality checks succeed?
76    Set acknowledgment result to success, and its reason to null
77    Skip forward to [endval]
78  Set acknowledgment result to failure, and its reason to chkfunc
79
80  -----[ endval ]-----------------------------
81  Acknowledge input request
82  End
```

The restart validation is performed prior to a restart validation, which is an operation that places a component into the initial condition that it was in when it was first powered on. Table 15 is an example of pseudo-code that can be used for the restart validation. The first step determines whether the primary condition of the component is working or ready (line 1). If it is, the acknowledgment result is set to success (line 2) and the input request is acknowledged (line 7), thereby allowing the restart realization to commence. If the primary condition of the component is neither working nor ready, then it is unusable or unready. It may then be in a condition where attempting to restart it might cause even further damage. The acknowledgment result is thus set to failure (line 4) and the input request is acknowledged, precluding the restart realization from being invoked.

TABLE 15

```
==================================================
                   Restart Validation
==================================================
 1  Is the condition of the self unit <working.*.*> or <ready.*.*>?
 2    Set acknowledgment result to success, and its reason to null
 3    Skip forward to [endval]
```

TABLE 15-continued

| | |
|---|---|
| 4 | Set acknowledgment result to failure, and its reason to chkself |
| 5 | |
| 6 | -----[ endval ]----------------------------- |
| 7 | Acknowledge input request |
| 8 | End |

The restore validation is performed prior to a restore validation, which is invoked to bring a component back into service. Such a component may have been idling as a standby component and the requester by this request wants to bring the component back into service as a working component, or to restore it as a ready component. Table 16 is an example of pseudo-code that can be used for the restore validation. The first step determines whether the primary condition of the component is unready (line 1). If it is, then a determination is made whether the secondary condition of the component is growth. The latter means that the component is one that is going through an initialization phase between the time when a component is first powered on and it is available for use (line 2). If it is, a determination is made whether the requested condition of the request is ready-.growth (line 3). That means the component should be moved up to the ready condition but it still is in the growth stage. If it is, processing skips to the growth check (growchk) subroutine (lines 8–13). In that subroutine a determination is made there whether the present request is a descendent of an original request (i.e., the present validation request is triggered as a result of trying to validate a request on another component) (line 9).

If it is, a determination is made whether the tertiary condition of the present component is family of equipment (the present component is having its condition changed because a parent of this component had its condition changed) (line 10). If it is, processing continues at the descendent check subroutine (decendchk) (lines 15–20). Herein, the condition of such a parent component is checked to determine whether it is in a condition that is invalid for restore, i.e., is it in a condition from which one cannot automatically restore a component (line 16). If it is, then the acknowledgment result is set to failure since a component will not be restored if its parent cannot be restored (line 17). The input request is then acknowledged as a failure and the restore realization is not invoked. If the parent can be restored, then the acknowledgment result is set to success (line 19) and the restore realization is allowed.

If the condition of the component is not family of equipment (line 10), then the component is independent of its parent, and the acknowledgment result is set to failure (line 12). That is, since it is known that the component is in a growth condition, but a descendent of another validation request, this component should not be automatically restored without a direct request to do so. If the requested condition of the input request is not ready.growth (line 3), the acknowledgment result is set to failure for reason that chkgrowth failed (line 5) since a component can only go from unready.growth to ready.growth. If the condition of the component is not unready (line 1), the acknowledgment result is set to failure (line 21) since one can only restore a component from an unready condition. Similarly, if the primary condition of the component is unready (line 1), but the secondary condition of the component is not growth (line 2), processing skips to the growchk subroutine. The previously described steps within that subroutine are then processed. If the request is not a descendant of an original request (line 9), the processing jumps to the decendchk subroutine (lines 15–20). If the condition of its parent component is not invalid-for-restore (or if there is no parent component), then the acknowledgment result is set to success (line 19), and the restore realization is allowed.

TABLE 16

==================================================
Restore Validation
==================================================

| | |
|---|---|
| 1 | Is the condition of the self unit <unready.*.*>? |
| 2 | Is the condition of the self unit <*.growth.*>? |
| 3 | Is the requested condition of the input request <ready.growth.*>? |
| 4 | Skip forward to [growchk] |
| 5 | Set acknowledgment result to failure, and its reason to chkgrowth |
| 6 | Skip forward to [endval] |
| 7 | |
| 8 | -----[ growchk ]----------------------------- |
| 9 | Is this request the descendant of the original request? |
| 10 | Is the condition of the self unit <*.*.family of equipment>? |
| 11 | Skip forward to [decendchk] |
| 12 | Set acknowledgment result to failure, and its reason to chkself |
| 13 | Skip forward to [endval] |
| 14 | |
| 15 | -----[ decendchk ]----------------------------- |
| 16 | Is the condition of the parent unit invalid for restore? |
| 17 | Set acknowledgment result to failure, and its reason to chkparent |
| 18 | Skip forward to [endval] |
| 19 | Set acknowledgment result to success, and its reason to null |
| 20 | Skip forward to [endval] |
| 21 | Set acknowledgment result to failure, and its reason to chkself |
| 22 | |
| 23 | -----[ endval ]----------------------------- |
| 24 | Acknowledge input request |
| 25 | End |

The switch validation is performed prior to a switch realization, which is invoked to change the conditions of a pair of components, one working and one standby so that the working component becomes standby and the standby component becomes working. The request is made to the working component and affects both the working component and its spare or mate. Table 17 is an example of pseudo-code that can be used for the switch validation. The first step determines whether the condition of the component is working.secondary, ready, unready or unusable, all of which are conditions that a component can be in if it is not working.primary (line 1). If it is, the acknowledgment result is set to failure with a reason chkself (line 2) since the switch request can only be made on a component that is working.primary. The input request is then acknowledged in the endval subroutine (lines 17–19) and no switch realization is performed. If the component is working.primary, a determination is then made whether the condition of the spare or mate component is working.secondary or ready (lines 5–6). If it is either, a determination is made whether the requested level of validation is greater than or equal to five (five or six). If it is, a determination is made whether the condition of the spare or mate component is invalid to make the switch (line 8). If so, the acknowledgment result is set to failure (line 9). If the spare or mate is not in an invalid state, then processing is forwarded (line 11) to the spare subroutine (lines 15–19). A determination is then made whether the LUG functionality checks have succeeded. (line 16) As previously discussed, the LUG functionality checks determine whether there are the correct number of components working.primary in a logical unit group if the switch is effected. If such check have succeeded, the acknowledgment result is set to success (line 17). If they have not, the acknowledgment result is set to failure (line 19). If the requested level of validation is less than five (line 7), processing skips to the spare subroutine since this is indicative of a more urgent request and the operation will be performed regardless of the condition of the spare or mate. Again, the LUG functionality checks determine whether the acknowledgment result is set to success or failure. If the condition of the spare or mate is neither working.secondary nor ready (line 5), then the acknowledgment result is set to failure (line 12).

TABLE 17

Figure 2:
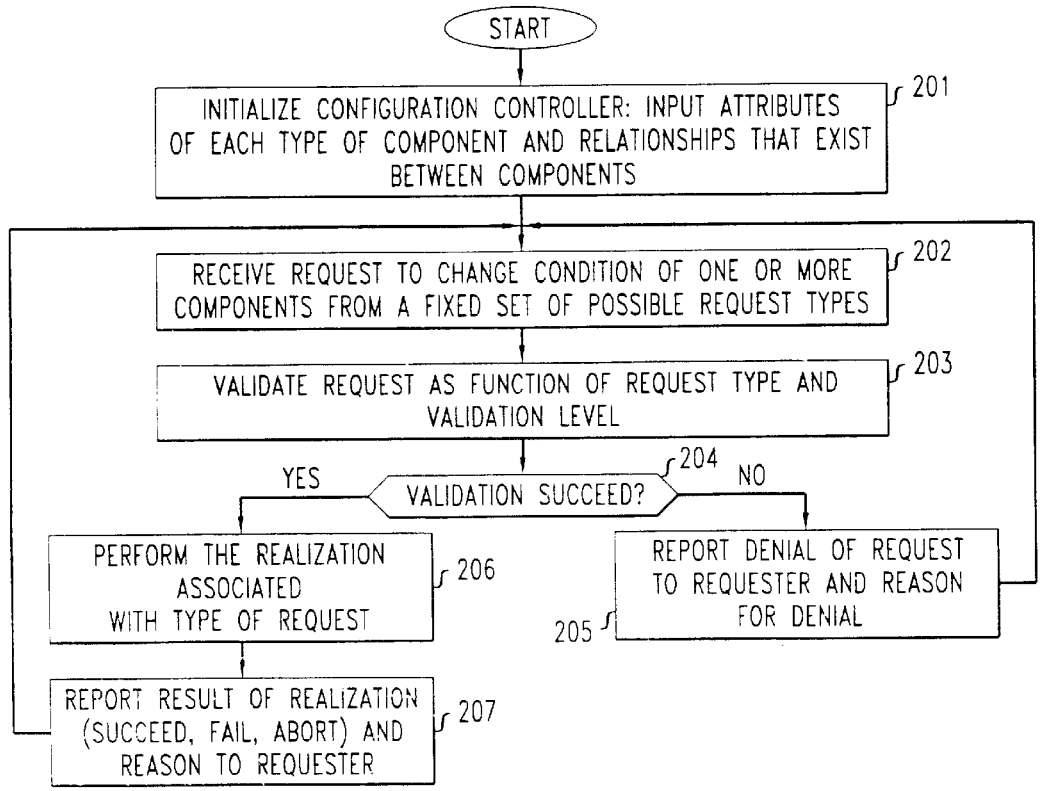
FIG. 2 is a flow chart showing the steps of an exemplary embodiment of the present invention.

====================================================
                    Switch Validation
====================================================
1   Is the condition of the self unit <working.secondary.*> or
2        <ready.*.*> or <unready.*.*> or <unusable.*.*>?
3       Set acknowledgment result to failure, and its reason to chkself
4       Skip forward to [endval]
5   Is the condition of the spare mate unit <working.secondary.*> or
6        <ready.*.*>?
7       Is the requested level of validation >= 5?
8           Is the condition of the spare mate unit invalid for switch?
9               Set acknowledgment result to failure, and its reason to chkmate
10              Skip forward to [endval]
11      Skip forward to [spare]
12  Set acknowledgment result to failure, and its reason to chkmate
13  Skip forward to [endval]
14
15  -----[  spare  ]------------------------------
16  Did the LUG functionality checks succeed?
17      Set acknowledgment result to success, and its reason to null
18      Skip forward to [endval]
19  Set acknowledgment result to failure, and its reason to chkfunc
20
21  -----[  endval  ]-----------------------------
22  Acknowledge input request
23  End FIG. 2 is a flowchart that summarizes the steps associated the above-described embodiment of the present invention. After starting, at step 201, the configuration controller is initialized by providing the type of each component in the system, and the relationships that exist between components in the system. In addition, any special relationships or conditions associated with any component are inputted, as, for example, a component being invalid for restore. At step 202, a request is received to change the condition of one or more components, where that request is from a fixed predetermined set of possible request types. Accompanying that request is a validation level which may be a function of the identity of the requester as well as a condition that the subject component of the request that the requester wants that component to have. At step 203, the request is validated as a function of the request type and validation level. As previously discussed, such validation may involve a specific algorithm associated with the request type, which determines the success, failure, or aborting of the validation processing. Alternatively, depending on the request type, the validation may be a blanket authorization to proceed regardless of where the request is originating. At step 204, a determination is made whether or not the validation succeeded. If it did not, at step 205, a report of the denial of the request is provided to the requester as well as a reason for the denial. The configuration controller then awaits the receipt of another request to change the condition of one or more components. If, at step 204, the validation is determined to have succeeded or if, for the particular request, there was a blanket authorization, then the realization associated with the request type is performed, at step 206, using the algorithm associated with that request type. That realization may succeed, abort or fail. If the realization succeeds, then the condition of the subject component is changed to the condition specified with the request. If it aborts or fails, then the condition of the subject component is not changed to the requested condition. At step 207, the result of the realization is provided to the requester together with additional information, such as the reason for the success, failure or abortion of the request. Processing then returns to await receipt from of a next request to change the condition of one or more components.

In the embodiment of the invention described above, requests are validated using a validation algorithm associated with the type of request before they are subsequently realized using a separate realization algorithm associated with that same request type. It should be well understood by one skilled in the art that the validation algorithms associated with the request types could be incorporated into and made part of their associated realization algorithms. Furthermore, it should be understood that the present invention could be implemented in an embodiment that dispenses with validation processing altogether, and incorporating only the realization of each request via an algorithm associated with the type of request from a fixed set of possible request types.

The configuration controller of the present invention can be implemented as software running on a processor to control either software components running on a system or hardware components, or a combination of hardware and software components. The configuration controller can also be implemented in hardware to similarly control either software components or hardware components, or a combination of hardware or software components in a system.

As previously described, in order to initialize the configuration controller, information regarding each component and the relationships that exist between components in the system needs to be provided. With reference again to FIG. 1, a graphical user interface (GUI) 110 displayed on a client terminal 111 has been devised that enables the attributes of each type of component 104-1–104-N within the system 102 to be specified as well as those relationships that exist between these components. This information is then used by the configuration controller 101 to effect the above-described validations and realizations upon a request to change the condition of a component in the system to a specified condition. This GUI provides an easy to use methodology for entering those component attributes and specifying those interrelationships, while providing a visual representation of those relationships to the system administrator, or whoever is setting up and initializing the configuration controller. Specifically, the system administrator interacts through the GUI 110 on client terminal 111 with processor 112 to supply the component attributes and component interrelationships, which information is stored in a database 113, which in turn is connected to the configuration controller 101. That information is then available to the request manager 107, the validator 108 and the realizer 109 as needed to process input requests. The graphical user interface is the subject of co-pending patent application, Ser. No. 09/464,602, filed on even date hereof.

As will be described, the administrator, for example, first creates representations of the components through the use of a palette of buttons from which a button for each component type can be created. If a component type has already been defined, and a button for that component type has already been established on the palette, by clicking on that button with a graphical pointing device 114, such as a mouse, connected to client terminal 111, an instance of that component type is created on the drawing area of the GUI. If a component of that particular type has not already been created, then a component of that type is created through a series of steps. Using a series of dialog boxes, through a list selection, the selection of a radio button, or typed-in values, all the attributes for a component type are specified. A button for that newly created component type is then created on the palette to enable as many components of that type to be defined on the viewing area of the GUI canvas window as may exist in the system. Thus each component of each type in the system is represented by some geometric shape (e.g., polygon, oval, etc) in the viewing area with as many instances of each such component type that exist in the actual system. Once all of the components of each type and each instance in the system have been defined, the relationships between those components displayed in the drawing area on the screen are established by selecting, through the graphical pointer, such as through the click of a computer mouse, a relationship type as, for example, the child relationship of one component to its parent component. By then clicking on the parent component and dragging the graphical pointer, such as the mouse, to its child component on the screen, a line is drawn between the two components and automatically labeled to indicate, for this example, the parent-child relationship. This creates in the processor 112, which is collecting all the information provided through the GUI and storing it in database 113, the relationship that exists between these components. This process is repeated for all the relationships between components in the system.

The GUI, through the processor 112, also checks for relationships that may be defined that cannot actually exist. For example, if component A is defined as the parent of component B, B cannot thereafter be defined as the parent of A. Thus, certain types of mistakes that might be made in defining relationships can be prevented.

Figure 3:
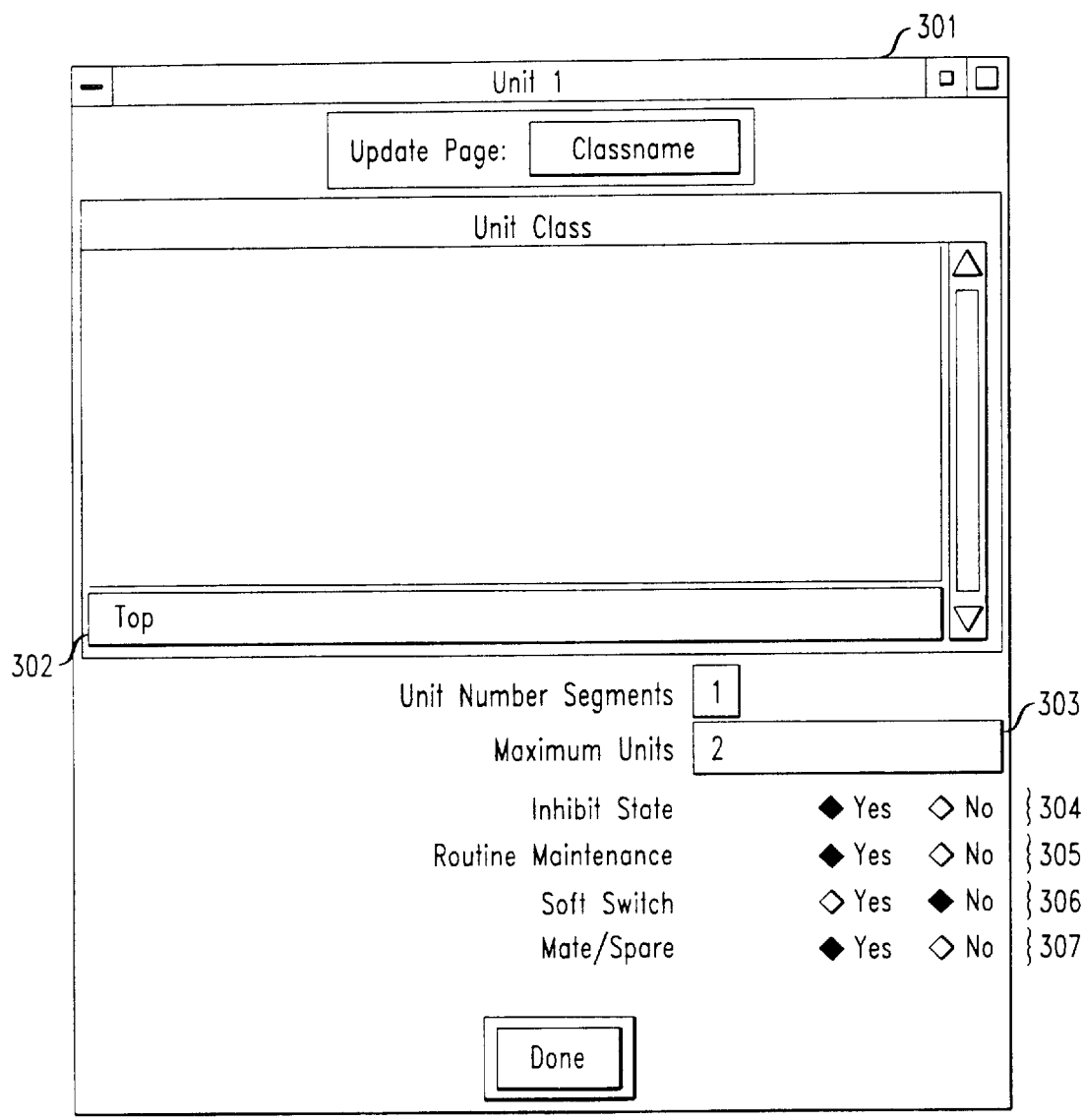
FIGS. 3–11 are windows in a graphical user interface used for specifying the characteristics of each component and the relationships between components in the system used as input to the configuration controller.

A first dialog box 301 for defining the attributes of a component type that has not already been defined is shown in FIG. 3. The first attribute to be filled in is a name in box 302 which, for example in FIG. 3, is Top. The other relevant attributes that need to filled in include Maximum Units in box 303, which when filled in indicates how many components of this type can be present in a valid configuration. In this example, "2" is typed in fill-in box 303. A list of binary attributes (yes or no) are then selected via sets of radio buttons 304, 305, 306 and 307. The Inhibit State button set 304 selects whether this particular component can have an inhibit state in its condition, i.e., whether or not its interrupt signals can be controlled. If the No button is selected, the condition of a component of the type Top will only consist of a primary, secondary, and tertiary condition. The selection of the Routine Maintenance button set 305 indicates whether or not a component of this type will ever goes through a routine maintenance procedure. The selection of the Soft Switch button set 306 indicates whether or not a backup component of this type will be able to process all of the work the active component is doing without the loss of the work being performed on this active component. The Mate/Spare button set 307 is redundant to information that is diagrammatically provided separately.

Figure 4:
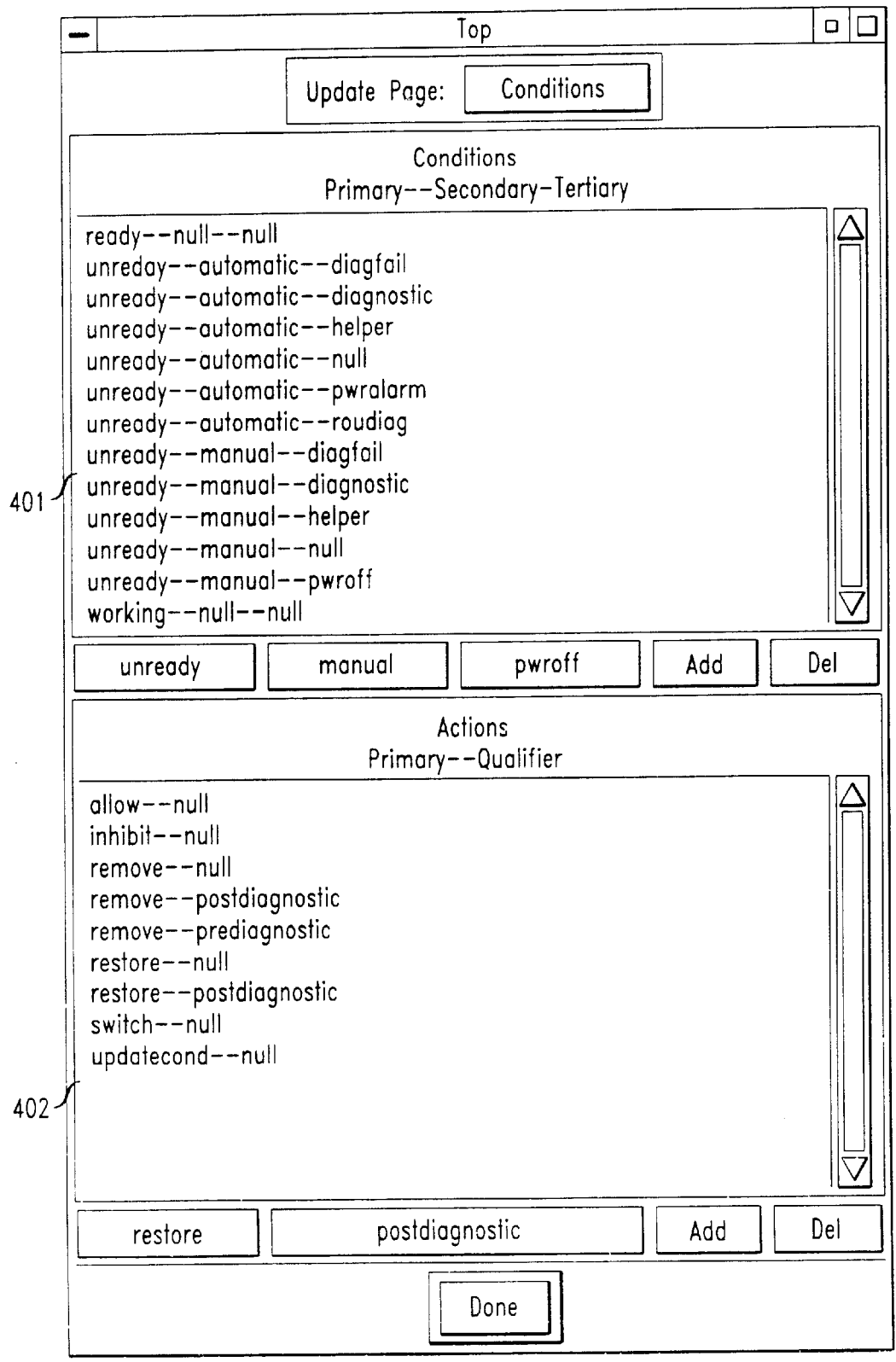

The dialog box in FIG. 4 includes an upper window 401 and a lower window 402. In the upper window 401, the administrator is able to define all the possible conditions (primary-secondary-tertiary) that a component of this type can be in. This is effected by inputting, as shown, each such possible condition. This information is inputted by the administrator based upon his or her knowledge of the actual component and the subset of all possible conditions that a component of this type can ever be in. In upper window 401, the listed conditions are those conditions for which components of the type Top can have, and which are entered, line-by-line, by the administrator. It should be apparent that the list of conditions is merely an example. The lower window 402 defines from all possible actions that can be performed on a component, a subset of those actions that can be performed on a component of this type. In the specific embodiment, a list of all possible actions is presented to the administrator and those specific actions that are permissible are selected by the administrator. Alternatively, each such action can be inputted by the administrator line-by-line. The qualifier associated with each action is part of the validation level, indicating who is requesting the action.

Figure 5:
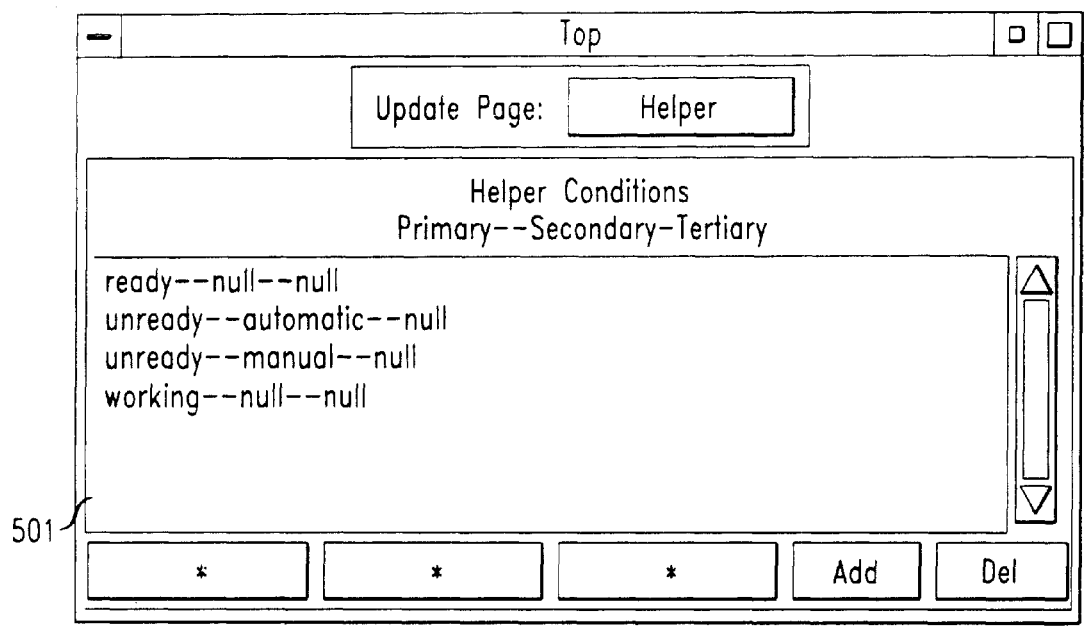

FIG. 5 illustrates a Helper dialog box 501 in which the administrator defines the conditions that a component of this type (Top, for this illustrative example) can be in when acting as a helper for a diagnostic for another component (generally of another type).

Figure 6:
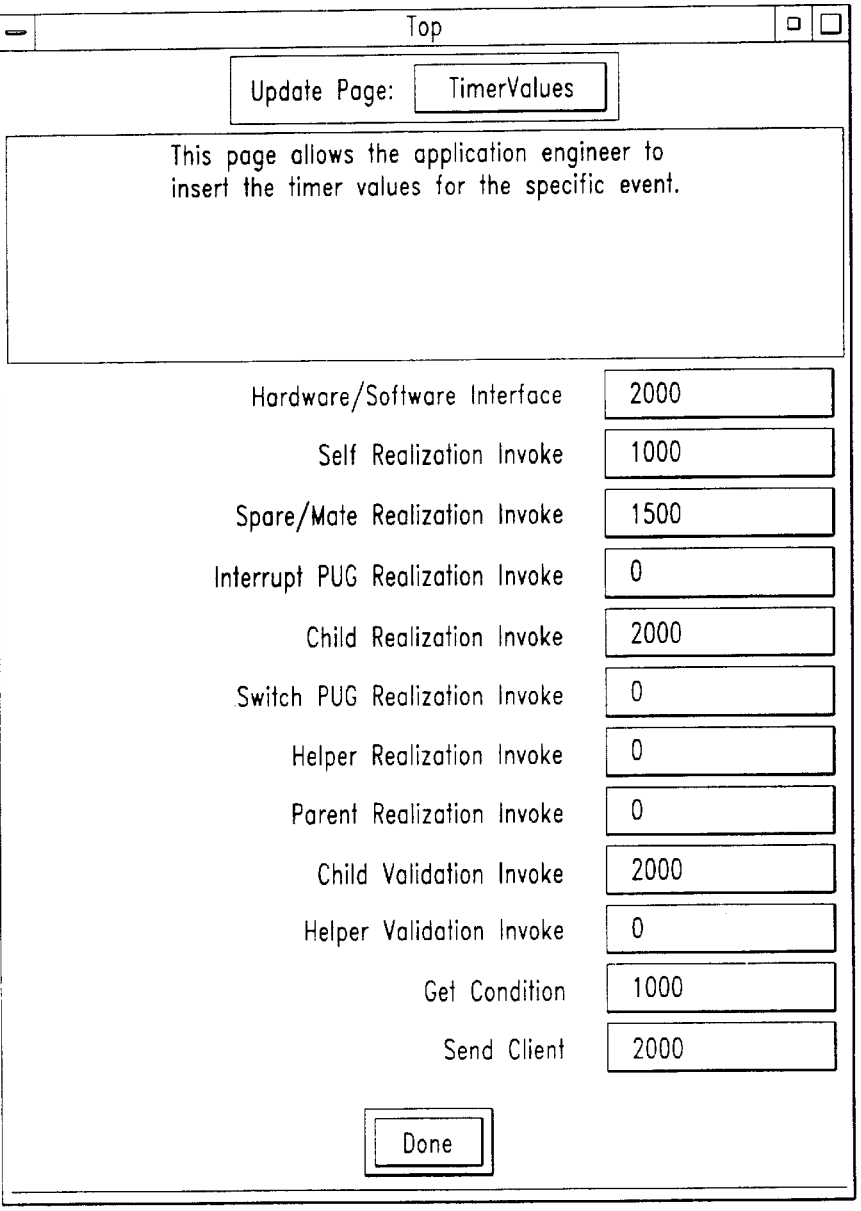

FIG. 6 illustrates a dialog box 601 for Timer Values, where timing values are provided in fill-in boxes 602 that are used to determine whether a specified operation has failed to occur. The administrator inputs a timer value in each fill-in box 602 for each noted operation. If such an operation is called upon to be effected with respect to any component of type Top within the system, and that operation fails to occur within the time-value specified for that operation, then the presumption is that the operation has failed. As previously described, the algorithm calling the invocation of that operation then reports a failure of that operation.

The values inputted through dialog boxes in FIGS. 3–6 together characterize the attributes of a component of the example Top. The attributes of each other type of component in a system are similarly defined through the input of values in these dialog boxes. Thus, in the example that follows, components of type Middle and type Bottom are defined in a similar manner. Once each type of component in the system is defined, each instance of each type of component and the relationships between the components in the actual system is graphically represented in a GUI canvas window for the configuration controller.

Figure 7:
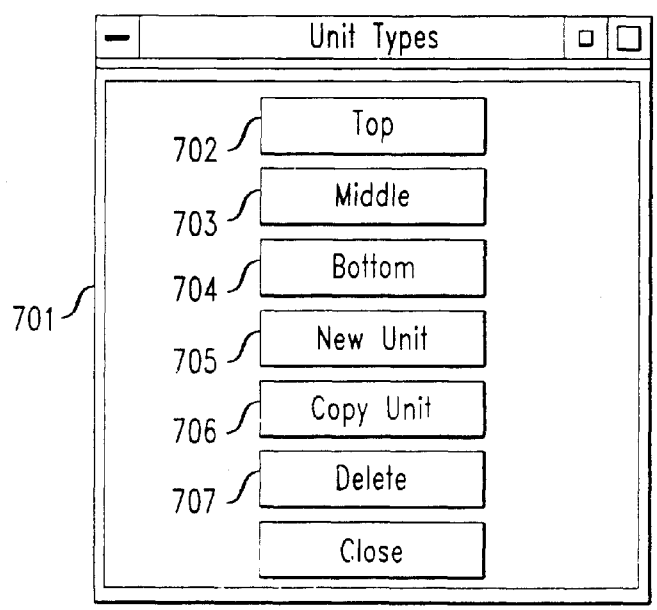

FIG. 7 shows the palette window of different component types that is used to create component instances on the GUI canvas screen. Buttons 702, 703 and 704, labeled Top, Middle, and Bottom, are component types that have been defined using the dialog boxes in the manner previously described. In order to create an instance of any one of those components, the administrator first clicks his mouse on the associated button in the palette and then clicks in the GUI canvas window where he wants to place that component. Upon clicking in the window, a polygon or other geometric shape representing the component appears in the canvas screen. Multiple instances of component types are defined on the canvas screen in a similar manner. By clicking on the New Unit button 705 on palette 701, the administrator can define a new component type through the dialog boxes described above in connection with FIGS. 3–6. When completed, a button with that newly created component type appears on palette 701. The Copy Unit button 706 enables the administrator to create a new type of component that might be similar to an existing component type, but slightly different with respect to some of its attributes. The Delete button 707 deletes one of the component types from the palette.

Figure 8:
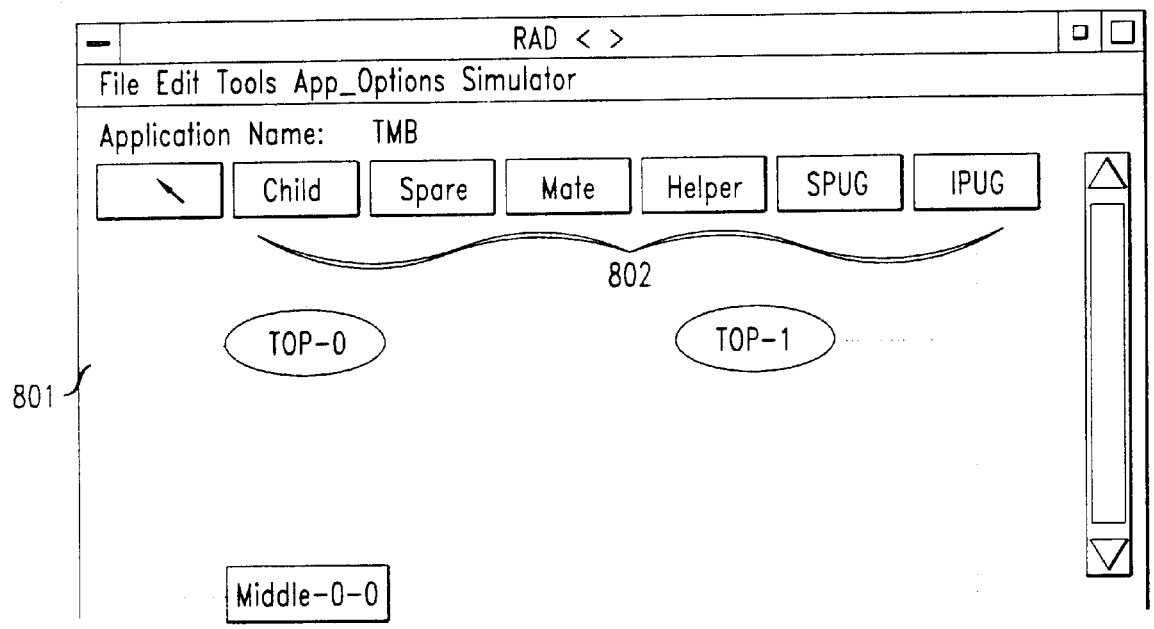
Figure 9:
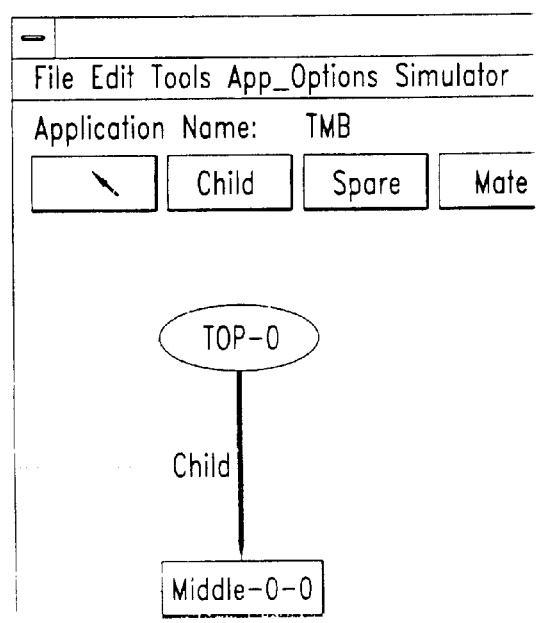

FIG. 8 shows a portion 801 of a GUI canvas window in which two components of type Top (labeled Top-0 and Top-1) and one component of type Middle (labeled Middle-0-0) have been created using the palette of FIG. 7. In order to define relationships between components, a particular relationship from among all the possible of the defined relationships is selected from a menu 802 across the top of the canvas window by clicking via the computer mouse on the appropriate relationship button. As noted in FIG. 8, these relationship buttons are Child, Spare, Mate, Helper, SPUG and IPUG, corresponding to the previously described component relationships. For example, to establish a parent-child relationship between two components, the administrator first clicks on the Child button in menu 802. The administrator then clicks on the component instance within window 801 that represents, for example, the parent component, such as the component of type Top that is labeled Top-0 in window 801. The administrator then drags the mouse pointer to the child component in window 801, such as the component of type Middle that is labeled Middle-0-0, where it is released. As noted in FIG. 9, which shows a portion of the window, a line is automatically drawn between these components and is labeled with the selected relationship, which for this example is the parent-child relationship. Further, that relationship is created between these two components by processor 112 and stored in database 113.

Figure 10:
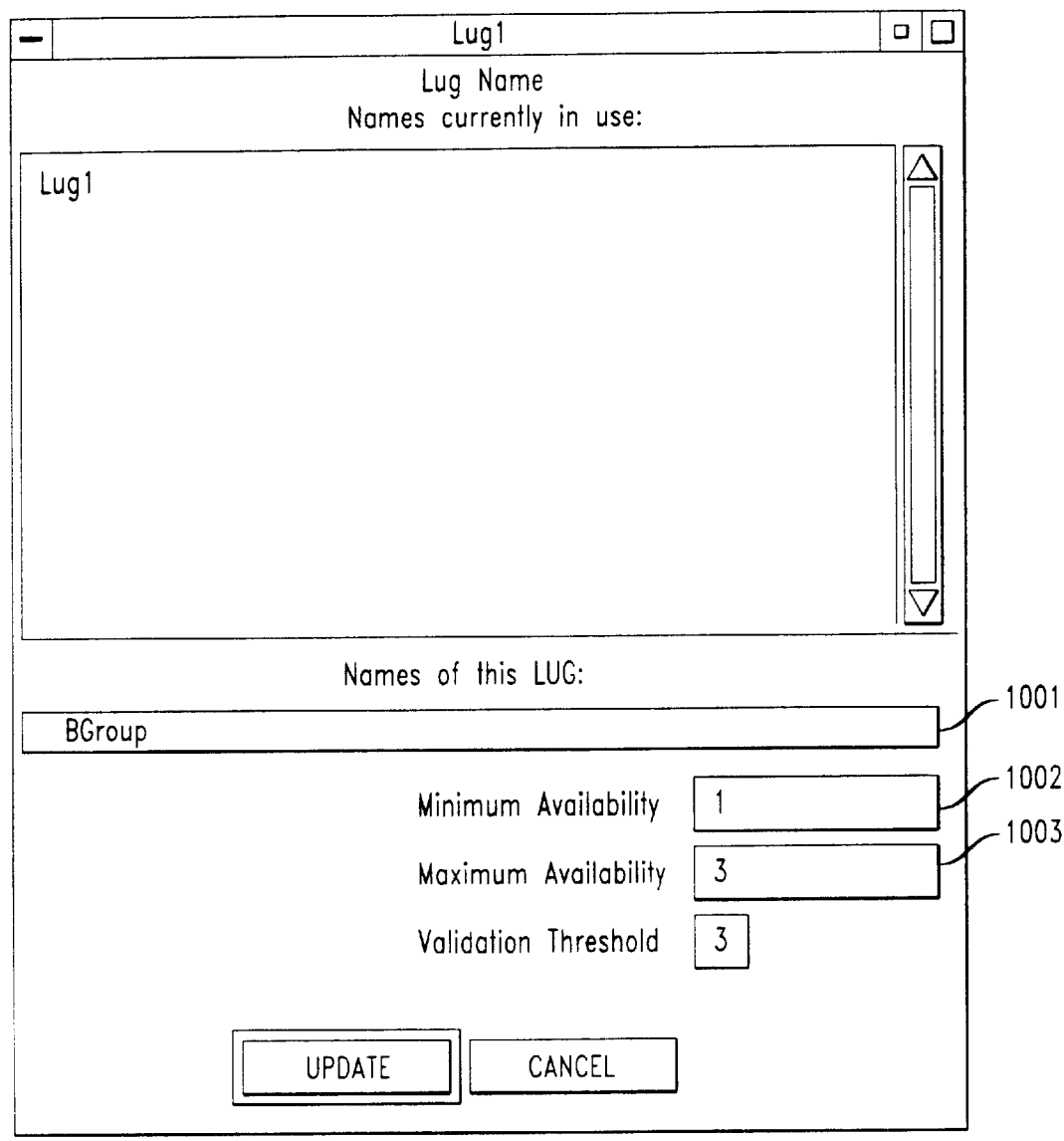
Figure 11:
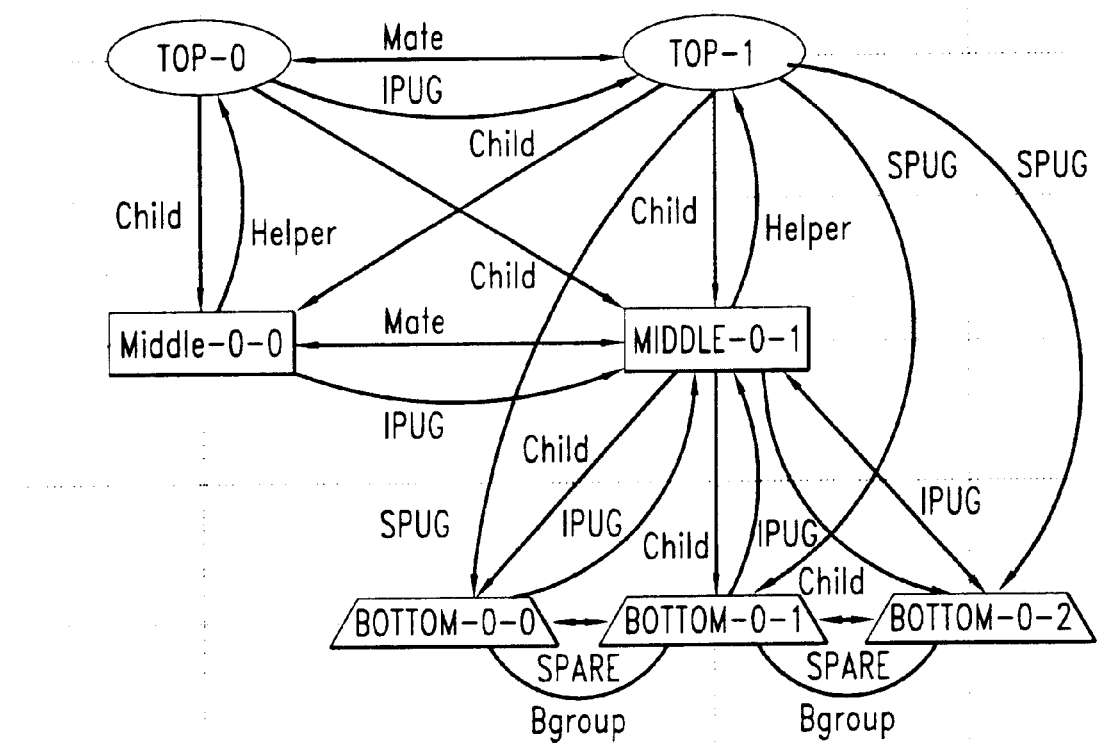

The logical unit group (LUG) relationship is created between component instances through a dialog window shown in FIG. 10. The administrator names the particular LUG in fill-in window 1001(e.g., Bgroup) and then specifies in the Minimum Availability window 1002 the minimum number of such components that need to be active (e.g., 1), and in the Maximum Availability window 1003, the maximum number of components that are to be active (e.g.,. 3) in any configuration. Each configuration can have plurality of LUGs. Each LUG, when established through the dialog window of FIG. 10 creates a LUG button in a palette (not shown) on the canvas window screen, similar to the buttons 802. Once a LUG button is created, that particular LUG relationship is established in the canvas window by clicking the mouse on that LUG button, and then clicking on a first component and dragging the mouse to a second component in that LUG relationship. All the components with that same LUG relationship are similarly defined FIG. 11 is an example of a canvas window screen in which all the relationships between components have been created as described above and then visually displayed. As can be noted, Top-0 and Top-1 have a mate relationship with each other, as do components Middle-0-0 and Middle-0-1. A parent-child relationship exists between Top-0 and both Middle-0-0 and Middle-0-1. A parent-child relationship also exists between Top-1 and Middle-0-0 and Middle-0-1. A parent-child relationship also exists between Middle-0-1 and Bottom-0-0, Bottom-0-1 and Bottom-0-2. There is a spare relationship between Bottom-0-0 and Bottom-0-1, and between Bottom-0-1 and Bottom-0-2. Middle-0-0 is also a helper to Top-0 and Middle-0-1 is a helper to Top-1. Top-1's SPUG includes Bottom-0-0-, Bottom-0-1 and Bottom-0-2. Top-0's IPUG is Top-1, Middle-0-0's IPUG is Middle-0-1. Bottom-0-O's IPUG is Middle-0-1, as is Bottom-0-1's and Bottom-0-2's IPUG. The units in the LUG Bgroup include Bottom-0-0, Bottom-0-1 and Bottom-0-2.

Advantageously, the afore-described GUI enables the attributes of each component type within a system and the relationships between components in the system to be specified. This information is stored by the processor 112 in database 113 and associated with the configuration controller is then used when a request for an action associated with any of the components is called upon in the manner described above.

The foregoing merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regards any means which can provide those functionalities as equivalent to those shown herein.

The invention claimed is:

1. A method of changing the condition of a component in a replicated component system that comprises a plurality of different components, the method comprising the steps of:

receiving a request to change the condition of the component to a specified condition, the request being of a type from a fixed set of request types; and realizing the request with an algorithm associated with the type of the request, a specific algorithm from a fixed set being associated with each request type in the fixed set of request types, the set of specific algorithms being common to a plurality of different replicated component systems;

determining whether the realization succeeded, aborted or failed; and providing to an originator of the request the result of the realization comprising an indication whether the realization succeed, aborted or failed and a reason why the realization succeeded, aborted or failed.

2. The method of claim 1 wherein the request type is from the fixed set of request types comprising: remove, restore, switch, inhibit, allow, restart, refresh, resynchronize, and update.

3. The method of claim 2 wherein the condition of a component comprises a primary condition, a secondary condition, a tertiary condition, and an inhibit state.

4. The method of claim 3 wherein the primary condition is one of working, ready, unready, and unusable.

5. The method of claim 3 wherein the secondary condition is one of primary, secondary, forced, automatic, manual, growth, and null.

6. The method of claim 3 wherein the tertiary condition is one of campon, degraded, diagfail, diagnostic, facfail, family of equipment, farfail, helper, init, interdiag, maintiprog, nearfail, pwralarm, pwroff, roudiag, trouble, update, warming, and null.

7. The method of claim 3 wherein the inhibit state is inhibited or uninhibited.

8. The method of claim 1 further comprising the step of initially specifying for each component in the system a type of component, and relationships that exist between the components in the system from a fixed set of possible relationships.

9. The method of claim 8 wherein the possible relationships that exist between components comprise child, spare, mate, helper, interrupt physical unit group, logical unit group, and switch physical unit group.

10. The method of claim 1 wherein the step of realizing the request comprises the step of first validating the request before the request is realized.

11. A method of changing the condition of a component in a replicated component system that comprises a plurality of different components, the method comprising the steps of:

receiving a request to change the condition of the component to a specified condition, the request being of a type from a fixed set of request types;

validating the request with a validation algorithm associated with the type of the request, a specific validation algorithm from a fixed set being associated with at least one of the request types in the fixed set of request types, the set of specific validation algorithms being common to a plurality of different replicated component systems;

determining whether or not the request has been validated successfully; and if the request has been validated successfully, realizing the request with a realization algorithm associated with the type of the request, a specific realization algorithm from a fixed set being associated with each request type in the fixed set of request types, the set of specific realization algorithms being common to a plurality of different replicated component systems.

12. The method of claim 11 further comprising the steps of:

determining whether the validation succeeded, aborted or failed; and providing to an originator of the request the result of the validation comprising an indication whether the validation succeeded, aborted or failed.

13. The method of claim 12 wherein the result of the validation further comprises a reason why the validation succeeded, aborted or failed.

14. The method of claim 11 further comprising the steps of:

determining whether the realization succeeded, aborted or failed; and providing to an originator of the request the result of the realization comprising an indication whether the realization succeeded, aborted or failed.

15. The method of claim 14 wherein the result of the realization further comprises a reason why the realization succeeded, aborted or failed.

16. The method of claim 11 wherein the request type is from the fixed set of request types comprising: remove, restore, switch, inhibit, allow, restart, refresh, resynchronize, and update.

17. The method of claim 16 wherein the condition of a component comprises a primary condition, a secondary condition, a tertiary condition, and an inhibit state.

18. The method of claim 17 wherein the primary condition is one of working, ready, unready, and unusable.

19. The method of claim 17 wherein the secondary condition is one of primary, secondary, forced, automatic, manual, growth, and null.

20. The method of claim 17 wherein the tertiary condition is one of campon, degraded, diagfail, diagnostic, facfail, family of equipment, farfail, helper, init, interdiag, maintiprog, nearfail, pwralarm, pwroff, roudiag, trouble, update, warming, and null.

21. The method of claim 17 wherein the inhibit state is one inhibited or uninhibited.

22. The method of claim 11 further comprising the step of initially specifying for each component in the system a type of component, and relationships that exist between the components in the system from a fixed set of possible relationships.

23. The method of claim 22 wherein the possible relationships that exist between components comprise child, spare, mate, helper, interrupt physical unit group, logical unit group, and switch physical unit group.

24. The method of claim 11 wherein a validation level is associated with the request, and the step of validating the request is performed as a function of the validation level.

25. A configuration controller for a replicated component system that comprises a plurality of different components, the controller comprising:

a request manager for receiving a request to change the condition of a component in the system to a specified condition, the request being of a type from a fixed set of request types; and a realizer connected to the request manager and though at least one interface to the components in the system for realizing the request with an algorithm associated with the type of the request, a specific algorithm from a fixed set being associated with each request type in the fixed set of request types, the set of specific algorithms being common to a plurality of different replicated component systems and wherein the realizer provides to the request manager an indication whether the realization succeeded, aborted or failed and a reason why the realization succeeded, aborted or failed.

26. The configuration controller of claim 25 wherein the request type is from the fixed set of request types comprising: remove, restore, switch, inhibit, allow, restart, refresh, resynchronize, and update.

27. The configuration controller of claim 26 wherein the condition of a component comprises a primary condition, a secondary condition, a tertiary condition, and an inhibit state.

28. The configuration controller of claim 27 wherein the primary condition is one of working, ready, unready, and unusable.

29. The configuration controller of claim 27 wherein the secondary condition is one of primary, secondary, forced, automatic, manual, growth, and null.

30. The configuration controller of claim 27 wherein the tertiary condition is one of campon, degraded, diagfail, diagnostic, facfail, family of equipment, farfail, helper, init, interdiag, maintiprog, nearfail, pwralarm, pwroff, roudiag, trouble, update, warming, and null.

31. The configuration controller of claim 27 wherein the inhibit state is inhibited or uninhibited.

32. The configuration controller of claim 25 wherein each of the components in the system is defined as being a particular type of component, and the components are related to one another from a fixed set of possible relationships.

33. The configuration controller of claim 32 wherein the possible relationships that exist between components comprise child, spare, mate, helper, interrupt physical unit group, logical unit group, and switch physical unit group.

34. A configuration controller for a replicated component system that comprises a plurality of different components, the controller comprising:
a request manager for receiving a request to change the condition of a component in the system to a specified condition, the request being of a type from a fixed set of request types;
a validator connected to the request manager for validating the request with a validation algorithm associated with the type of the request, a specific validation algorithm from a fixed set being associated with at least one of the request types in the fixed set of request types, the set of specific validation algorithms being common to a plurality of different replicated component systems; and
a realizer connected to the request manager and though at least one interface to the components in the system for realizing the request with a realization algorithm associated with the type of the request if the request has been validated successfully by the validator, a specific realization algorithm from a fixed set being associated with each request type in the fixed, set of request types, the set of specific realization algorithms being common to a plurality of different replicated component systems.

35. The configuration controller of claim 34 wherein the validator provides to the request manager an indication whether the validation succeeded, aborted or failed.

36. The configuration controller of claim 35 wherein the validator further provides to the request manager a reason why the validation succeeded, aborted or failed.

37. The configuration controller of claim 34 wherein the realizer provides to the request manager an indication whether the realization succeeded, aborted or failed.

38. The configuration controller of claim 37 wherein the realizer further provides to the request manager a reason why the validation succeeded, aborted or failed.

39. The configuration controller of claim 34 wherein the request type is from the fixed set of request types comprising: remove, restore, switch, inhibit, allow, restart, refresh, resynchronize, and update.

40. The configuration controller of claim 39 wherein the condition of a component comprises a primary condition, a secondary condition, a tertiary condition, and an inhibit state.

41. The configuration controller of claim 40 wherein the primary condition is one of working, ready, unready, and unusable.

42. The configuration controller of claim 40 wherein the secondary condition is one of primary, secondary, forced, automatic, manual, growth, and null.

43. The configuration controller of claim 40 wherein the tertiary condition is one of campon, degraded, diagfail, diagnostic, facfail, family of equipment, farfail, helper, init, interdiag, maintiprog, nearfail, pwralarm, pwroff, roudiag, trouble, update, warming, and null.

44. The configuration controller of claim 40 wherein the inhibit state is inhibited or uninhibited.

45. The configuration controller of claim 34 wherein each of the components in the system is defined as being a particular type of component, and the components are related to one another from a fixed set of possible relationships.

46. The configuration controller of claim 45 wherein the possible relationships that exist between components comprise child, spare, mate, helper, interrupt physical unit group, logical unit group, and switch physical unit group.

47. The configuration controller of claim 34 wherein a validation level is associated with the request, and the validator validates the request as a function of the validation level.

48. A computer readable medium storing computer program instructions which are executable on a computer system implementing a configuration controller for a replicated component system that comprises a plurality of different components, said computer program instructions comprising instructions defining the steps of:
receiving a request to change the condition of the component to a specified condition, the request being of a type from a fixed set of request types;
realizing the request with an algorithm associated with the type of the request, a specific algorithm from a fixed set being associated with each request type in the fixed set of request types, the set of specific algorithms being common to a plurality of different replicated component systems;
determining whether the realization succeeded, aborted or failed; and
providing to an originator of the request the result of the realization comprising an indication whether the realization succeed, aborted or failed and a reason why the realization succeeded, aborted or failed.

49. A computer readable medium storing computer program instructions which are executable on a computer system implementing a configuration controller for a replicated component system that comprises a plurality of different components, said computer program instructions comprising instructions defining the steps of:

receiving a request to change the condition of the component to a specified condition, the request being of a type from a fixed set of request types;

validating the request with a validation algorithm associated with the type of the request, a specific validation algorithm from a fixed set being associated with at least one of the request types in the fixed set of request type, the set of specific validation algorithms being common to a plurality of different replicated component systems;

determining whether or not the request has been validated successfully; and if the request has been validated successfully, realizing the request with a realization algorithm associated with the type of the request, a specific realization algorithm from a fixed set being associated with each request type in the fixed set of request types, the set of specific validation algorithms being common to a plurality of different replicated component systems.

* * * * *